(12) United States Patent
Wigren et al.

(10) Patent No.: US 12,166,721 B2
(45) Date of Patent: Dec. 10, 2024

(54) MANAGEMENT OF ACKNOWLEDGEMENT SIGNALLING IN A MULTI-POINT COMMUNICATION SYSTEM

(71) Applicant: Telefonaktiebolaget LM Ericsson (publ), Stockholm (SE)

(72) Inventors: Torbjörn Wigren, Uppsala (SE); Ramon Delgado, Elermore Vale (AU); Richard Middleton, North Lambton (AU); Katrina Lau, Wallsend (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 542 days.

(21) Appl. No.: 17/271,170

(22) PCT Filed: Aug. 31, 2018

(86) PCT No.: PCT/SE2018/050879
§ 371 (c)(1),
(2) Date: Feb. 24, 2021

(87) PCT Pub. No.: WO2020/046184
PCT Pub. Date: Mar. 5, 2020

(65) Prior Publication Data
US 2021/0258126 A1 Aug. 19, 2021

(51) Int. Cl.
*H04L 5/00* (2006.01)
(52) U.S. Cl.
CPC .......... *H04L 5/0055* (2013.01); *H04L 5/0064* (2013.01)
(58) Field of Classification Search
CPC ............................ H04L 5/0055; H04L 5/0064
(Continued)

(56) References Cited

U.S. PATENT DOCUMENTS

| 2015/0207734 | A1  | 7/2015  | Livet et al. |
| 2020/0084155 | A1* | 3/2020  | Song ............... H04L 49/9068 |
| 2020/0358886 | A1* | 11/2020 | Wei ..................... H04L 1/1893 |

FOREIGN PATENT DOCUMENTS

EP   1798898 A1   6/2007

OTHER PUBLICATIONS

International Search Report and the Written Opinion of the International Searching Authority, issued in corresponding International Application No. PCT/SE2018/050879, dated May 23, 2019, 15 pages.
(Continued)

*Primary Examiner* — Faisal Choudhury
(74) *Attorney, Agent, or Firm* — Rothwell, Figg, Ernst & Manbeck, P.C.

(57) ABSTRACT

A method for controlling acknowledgement signalling in a multi-point communication system comprises receiving (S10), in a wireless device, a data item over a first signalling path out of a plurality of possible signalling paths. Signalling path information associated with the received data item is obtained (S20). A transmission of an acknowledgement message for the data item is initiated (S40) to be performed over a second signalling path out of the plurality of possible signalling paths selected in dependence of the obtained signalling path information. Alternatively, or in combination, initiating of a transmission of an acknowledgement message comprising attaching of information of the identity of the second signalling path to the acknowledgement message. Methods, performed in a network node, assisting the wireless device are also disclosed. Devices for the methods are also presented.

11 Claims, 21 Drawing Sheets

(58) Field of Classification Search
USPC .......................................................... 370/329
See application file for complete search history.

(56) References Cited

OTHER PUBLICATIONS

Middleton et al. "Data Flow Delay Equalization for Feedback Control Applications Using 5G Wireless Dual Connectivity" IEEE, 2017, 7 pages.
Wigren et al. "Globally Stable Wireless Data Flow Control" IEEE Transactions on Control of Network Systems, vol. 5, No. 1, Mar. 2018, pp. 469-478.
Delgado et al. "Networked Delay Control for 5G Wireless Machine-Type Communications Using Multiconnectivity" IEEE Transactions on Control Systems Technology, 2018, 16 pages.

\* cited by examiner

MANAGEMENT OF ACKNOWLEDGEMENT SIGNALLING IN A MULTI-POINT COMMUNICATION SYSTEM

CROSS REFERENCE TO RELATED APPLICATION(S)

This application is a 35 U.S.C. § 371 National Phase Entry Application from PCT/SE2018/050879, filed Aug. 31, 2018, designating the United States, the disclosure of which is incorporated herein by reference in its entirety.

TECHNICAL FIELD

The proposed technology generally relates to methods and devices for controlling acknowledgement signalling in a multi-point communication system.

BACKGROUND

Today's wireless cellular systems have been designed to handle very efficient data transfer between a single user equipment (UE) and a single base station, denoted eNB in fourth generation (4G) systems and gNB in fifth generation (5G) systems. These solutions are sufficient at today's carrier frequencies close to 1-2 GHz. In future 5G cellular system a shift towards higher carrier frequencies is a necessity, to be able to utilize the available spectrum, thereby achieving a higher capacity overall.

A consequence of the move to higher carrier frequencies is that the radio propagation is transformed from "diffuse" scattering to beamlike propagation. This effect is also present for lower frequency bands say in the 3-4 GHz region, in particular since massive beamforming using the new advanced antenna systems, so-called Antenna Array Systems (AAS) are becoming widely used also at these lower frequency bands. The beamlike radio propagation leads to sharp diffraction effects and increasingly heavy radio shadowing behind obstacles. This in turn makes it more difficult to obtain uniform coverage from a single 5G base station.

The implication is a need to transmit from multiple non-co-located transmit points, to cover a single cell. Such massive multi-point transmission will soon be under standardization for New Radio (NR) radio access in 3rd Generation Partnership Project (3GPP). It should be noted that multi-point transmission is also considered for the present 4G Long-Term Evolution (LTE) system, however, the need and also the massiveness of the solutions for 4G are believed to be less than those of future 5G cellular systems. The same is true for the Institute of Electrical and Electronics Engineering (IEEE) standards of which WIFI constitute a major part.

In a massive multi-point transmission system, where data is arriving from uplink nodes, each involved transmit point needs to be given access to portions of this data, for transmission over the wireless interface. In many applications the data is closely related to data simultaneously being transmitted from other transmit points.

This is e.g. the case for streaming video, in which case the data for a specific part of the video are needed at the same time to within a certain pre-determined re-ordering margin in the receiving UE. Another related use case is the case when video is distributed to large multi-user screens and the corresponding audio is sent to e.g. individual user headsets, to minimize audio interference. In such case the audio and video streams may need to be time aligned in the UEs. It should here be noted that the different transmit points may transmit different data, or the same data for diversity gain, or a mix of these alternatives.

The use of a multi-point transmission system also opens up for more sophisticated scheduling schemes. Access points being very useful for e.g. high-load DownLink (DL) signalling may advantageously not be utilized for low-prioritized signalling. Also different kinds of non-time crucial control signalling may be performed avoiding the most useful access points. However, a more flexible scheduling of UpLink (UL) and DL signalling may cause unfavourable consequences in many applications, such as e.g. time alignment. In particular, measurement of the round trip delays of involved multiple data paths will be deteriorated in case data acknowledgement messages travel over different data paths in the UL compared to the data package it acknowledges reception of.

There are thus problems in multi-point signalling enabling flexible scheduling to simultaneously maintain e.g. time alignment mechanisms.

SUMMARY

It is an object to provide mechanisms allowing flexible scheduling but at the same time enabling maintaining of e.g. time alignment mechanisms.

This and other objects are met by embodiments of the proposed technology.

According to a first aspect, there is provided a method for controlling acknowledgement signalling in a multi-point communication system. The method comprises receiving, in a wireless device, a data item over a first signalling path out of a plurality of possible signalling paths. Signalling path information associated with the received data item is obtained. A transmission of an acknowledgement message for the data item is initiated over a second signalling path out of the plurality of possible signalling paths. The second signalling path is selected in dependence of the obtained signalling path information.

According to a second aspect, there is provided a method for controlling acknowledgement signalling in a multi-point communication system. The method comprises receiving, in a wireless device, a data item over a first signalling path out of a plurality of possible signalling paths. A transmission of an acknowledgement message for the data item is initiated over a second signalling path out of the plurality of possible signalling paths. The initiating comprising attaching of information of the identity of the second signalling path to the acknowledgement message.

According to a third aspect, there is provided a method for assisting in controlling acknowledgement signalling in a multi-point communication system. The method comprises attaching, in a network node, to a data item, intended to be transmitted over a first signalling path out of a plurality of possible signalling paths, information about an identity of a particular signalling path to be selected as a second signalling path out of the plurality of possible signalling paths for an acknowledgement message for the data item.

According to a fourth aspect, there is provided a method for assisting in controlling acknowledgement signalling in a multi-point communication system. The method comprises attaching, in a network node, to a data item, intended to be transmitted over a first signalling path out of a plurality of possible signalling paths, an indication of a request for specifying a signalling path out of the plurality of possible signalling paths for acknowledgement messages.

According to a fifth aspect, there is provided a method for assisting in controlling acknowledgement signalling in a multi-point communication system. The method comprises detecting, in a network node, a second signalling path, out of a plurality of possible signalling paths, on which an acknowledgement message of a data item sent on a first signalling path, out of a plurality of possible signalling paths, was received. Information of the identity of the second signalling path is attached to the acknowledgement message.

According to a sixth aspect, there is provided a wireless device configured to control acknowledgement signalling in a multi-point communication system. The wireless device is configured to receive a data item over a first signalling path out of a plurality of possible signalling paths. The wireless device is further configured to obtain signalling path information associated with the received data item. The wireless device is further configured to initiate a transmission of an acknowledgement message for the data item over a second signalling path out of the plurality of possible signalling paths. The second signalling path is selected in dependence of the obtained signalling path information.

According to a seventh aspect, there is provided a wireless device configured to control acknowledgement signalling in a multi-point communication system. The wireless device is configured to receive a data item over a first signalling path out of a plurality of possible signalling paths. The wireless device is further configured to initiate a transmission of an acknowledgement message for the data item over a second signalling path out of the plurality of possible signalling paths. This initiating comprises attaching of information of the identity of the second signalling path to the acknowledgement message.

According to an eighth aspect, there is provided a network node configured to assist in controlling acknowledgement signalling in a multi-point communication system. The network node device is configured to attach to a data item, intended to be transmitted over a first signalling path out of a plurality of possible signalling paths, information about an identity of a particular signalling path to be selected as a second signalling path out of the plurality of possible signalling paths for an acknowledgement message for the data item.

According to a ninth aspect, there is provided a network node configured to assist in controlling acknowledgement signalling in a multi-point communication system. The network node is configured to attach to a data item, intended to be transmitted over a first signalling path out of a plurality of possible signalling paths, an indication of a request for specifying a signalling path out of the plurality of possible signalling paths for acknowledgement messages.

According to a tenth aspect, there is provided a network node configured to assist in controlling acknowledgement signalling in a multi-point communication system. The network node is configured to detect a link on which an acknowledgement message of a data item sent on a first signalling path out of a plurality of possible signalling paths was received. The network node is further configured to attach information of the identity of the link to the acknowledgement message.

According to an eleventh aspect, there is provided a computer program comprising instructions, which when executed by at least one processor, cause the processor(s) to receive a data item over a first signalling path out of a plurality of possible signalling paths. The instructions, when executed by the processor(s), further cause the processor(s) to obtain signalling path information associated with the received data item. The instructions, when executed by the processor(s), further cause the processor(s) to initiate a transmission of an acknowledgement message for the data item over a second signalling path out of the plurality of possible signalling paths. The second signalling path is selected in dependence of the obtained signalling path information.

According to a twelfth second aspect, there is provided a computer program comprising instructions, which when executed by at least one processor, cause the processor(s) to receive a data item over a first signalling path out of a plurality of possible signalling paths. The instructions, when executed by the processor(s), further cause the processor(s) to initiate a transmission of an acknowledgement message for the data item over a second signalling path out of the plurality of possible signalling paths. The initiating also comprises attaching of information of the identity of the second signalling path to the acknowledgement message.

According to a thirteenth aspect, there is provided a computer program comprising instructions, which when executed by at least one processor, cause the processor(s) to attach, to a data item, intended to be transmitted over a first signalling path out of a plurality of possible signalling paths, information about an identity of a particular signalling path to be selected as a second signalling path out of the plurality of possible signalling paths for an acknowledgement message for the data item.

According to a fourteenth aspect, there is provided a computer program comprising instructions, which when executed by at least one processor, cause the processor(s) to attach, to a data item, intended to be transmitted over a first signalling path out of a plurality of possible signalling paths, an indication of a request for specifying a signalling path out of the plurality of possible signalling paths for acknowledgement messages.

According to a fifteenth aspect, there is provided a computer program comprising instructions, which when executed by at least one processor, cause the processor(s) to detect a second signalling path, out of a plurality of possible signalling paths, on which an acknowledgement message of a data item sent on a first signalling path, out of a plurality of possible signalling paths, was received. The instructions, when executed by the processor(s), further cause the processor(s) to attach information of the identity of the second signalling path to the acknowledgement message.

According to a sixteenth aspect, there is provided a computer-program product comprising a computer-readable medium having stored thereon a computer program of any of the eleventh to fifteenth aspects.

An advantage of the proposed technology is that path relations between DL signalling and UL acknowledgement signalling is spread in the system, enabling reliable scheduling as well as time alignment.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of some use cases giving some insight of the technical problem.

Figure 1:
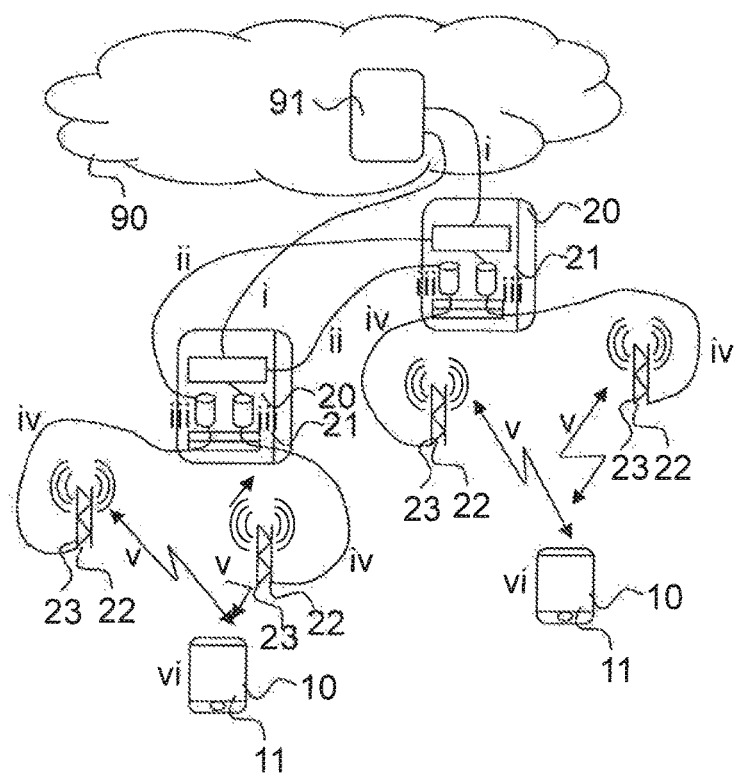
FIG. 1 is an illustration of a tactile wireless internet gaming application in a two node transmission scenario.

In a first example, an Ultra-Reliable Low Latency Communication (URLLC) system is used as a model system. A typical URLLC use case anticipated to become frequent in wireless 5G NR systems is depicted in FIG. 1. The figure is a schematic illustration of a tactile wireless internet gaming application in a two node transmission scenario. The generalization to n-node transmission is straightforward for the proposed invention.

It is well known in prior art that the use of tactile feedback requires a low round trip delay, not exceeding about 5 milliseconds. In the case of FIG. 1, this delay budget therefore need to be contained when considering the delay from one tactile smart phone, to the other tactile smart phone, and back. To avoid delay variation and additional buffering delay, it is also needed to align the round trip delays over all data paths indicated in the figure.

To describe FIG. 1 and the end-to-end delay alignment architecture in a multi-point communication system 1 in more detail, the starting point is taken to be in one of the UEs 10, in this case a tactile smart phone 11. Dual, or more generally multi, connectivity transmission is used to these smart phones 11. This smart phone 11 is supposed to be equipped with tactile force feedback functionality, either in the phone itself or in a connected hardware device. This functionality could comprise actuators that allow the user to feel a force related to an object simulated in the other smart phone 11, in response to own movement of e.g. fingers over the representation of said remote object in the own smart phone 11. This representation and the force commands affecting the actuators of the own smart phone 11, would be generated in the other smart phone, based on transmitted descriptions of the movements over the representation of the remote object in the own smart phone 11. This explains how an end-to-end force feedback loop is operating between the two tactile smart phones 11.

The data transmission between the two tactile smart phones 11 is handled by a tactile virtual reality (VR) server 91 located in the cloud 90. This VR server 91 receives movement data feedback and force feedback actuator commands from each tactile smart phone 11, after which it re-distributes it to the other tactile smart phone 11 continuously, typically with each type of information received and forwarded with a constant sampling rate significantly higher than the inverse of the desired round trip delay, typically lower than 5 milliseconds. The data paths from the tactile VR server 91 to the tactile smart phones 11 may comprise (i) an internet transport link to an input queue of a base station 20, in this case a gNB 21, associated with a first delay, (ii) Radio Access Network (RAN) internal transport links from the input queue to several transmission queues, in the same or connected other gNBs 21, each RAN transport associated with a separate second delay, (iii) transmission queues, each transmission queue associated with a third separate transmission queue delay originating from data traversing the queues, (iv) antennas 22, in this case AAS 23 radio transport links, each transport associated with a fourth delay, (v) wireless interfaces, each wireless interface being associated with a separate wireless delay, and (vi) UE processing functionality, each UE 10 having a separate processing delay. All these six connections operate both in a downlink, i.e. to the UE 10, and uplink, i.e. from the UE 10, direction. Each UE 10 is associated with one complete downlink and uplink connection, each one extending over the six link parts discussed above.

When keeping track on the delays in the different parts of the system, round trip time measurements are typically used, where delays of both the initial message as well as of the acknowledgement reply contribute. The measured delays may thus vary depending on, not only the selected path, but also on the path on which the acknowledgement message was returned. Without knowledge about the planning of acknowledgement signalling, the task for estimating delays becomes very complex, if not impossible to perform.

Figure 2:
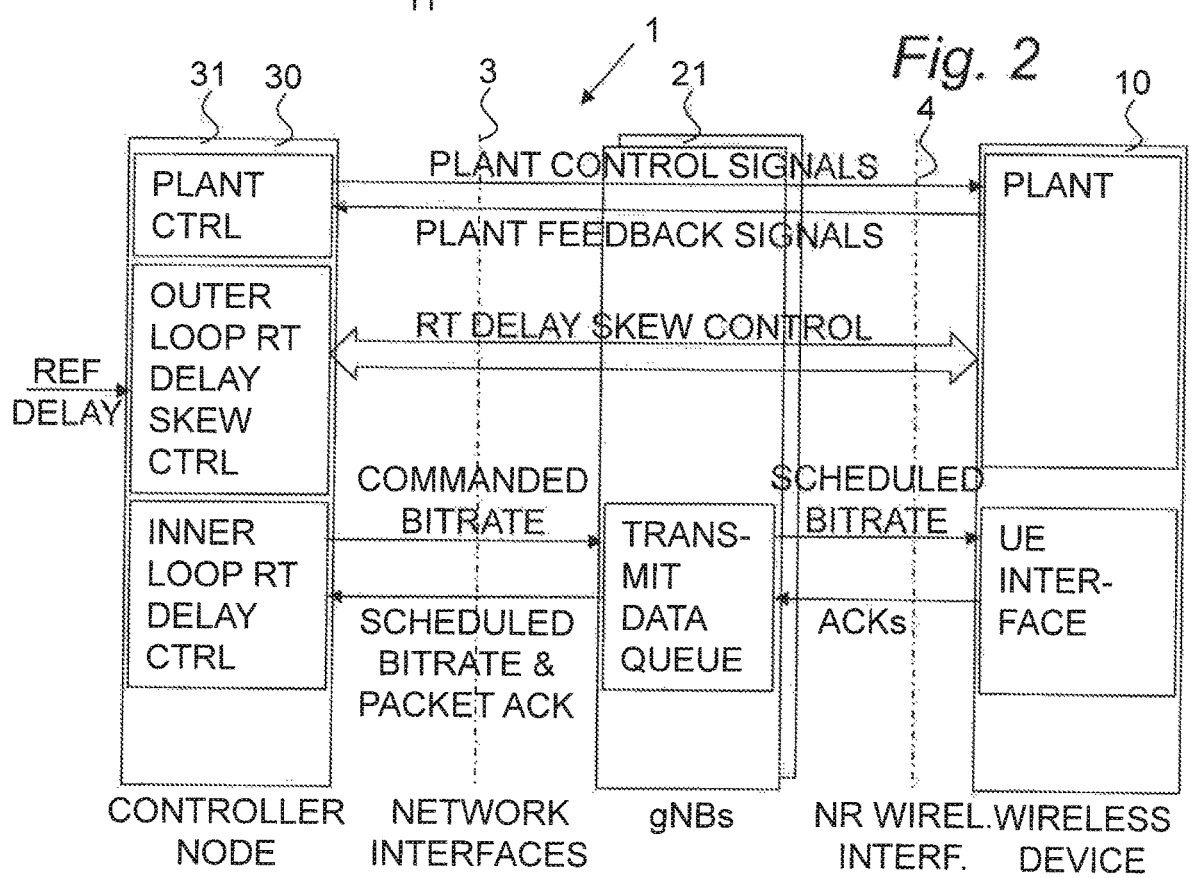
FIG. 2 is an example of a downlink delay aligning control scheme of a 5G base station.

As another example, a round trip delay aligning control use case can be illustrated. The application layer is depicted on top, with the functionality of the delay aligning controller shown below. There the task is to regulate the delay and delay skews, as measured from a network node 30, in this case a controller node 31, of FIG. 2, over the network interfaces to a multitude of gNBs 21 (in 5G NR), through the transmit data queues, over the wireless interface to the UE 10, back over the wireless interface, and relayed over the transmission nodes back to the controller node. Note that in this case the time of transmission of a data item and the time when the acknowledgment is received back, can be measured in the controller node alone, synchronization is therefore not needed. The mechanism by which the controller works, i.e. by manipulation of the data rates to each transmission node, to vary the transmit queue dwell time, is the same as in the downlink delay aligning control use case. As is clear from FIG. 2, the delay aligning controller operates at a lower layer than the one where application data is transmitted.

From this illustration, it becomes clear that the round trip delay aligning control is heavily dependent on the choice of acknowledgement signalling path. In order to enable a proper round trip delay aligning control, knowledge of the relation between the original data packet path and the acknowledgement reply path is required.

Such a knowledge of the relation between the original data packet path and the acknowledgement reply path can be achieved by either enforcing specific relations and/or by distribution of the knowledge about the original data packet path and/or the acknowledgement reply path.

One option is thus to enforce a restriction for multi-path transmission so that acknowledgement messages are to be sent back from the UE to the controller node e.g. over the same data path as used to send the data that was acknowledged, or over another specified path. This requires that the data items are marked with the ID of the transmission node or that the UE can identify the transmission path in any other way. The enforcement may be controlled by a general agreement or configuration or may be activated by an explicit request.

Another option is that the acknowledgment message is marked with the information that allows an identification e.g. of the data path of the uplink transmission node, before being sent back to the controller node or during the transmission. The party receiving the acknowledgement may combine this information with information about the original downlink path to obtain the path relation.

Throughout the present disclosure, "data item" denotes a data entity intended for carrying information between a source of data and a UE. Such a data item can comprise user data, control data or even dummy data, or combinations thereof. A data item may, for example, comprise data associated with at least a part of a control signal. A data item may also, for example, comprise user data, for example, but not limited to, video, audio, image, text or document data packages. A data item may also, for example, comprise dummy data items, introduced only to meet regulation rate requirements.

The two options above may also be combined in different combinations.

Figure 3:
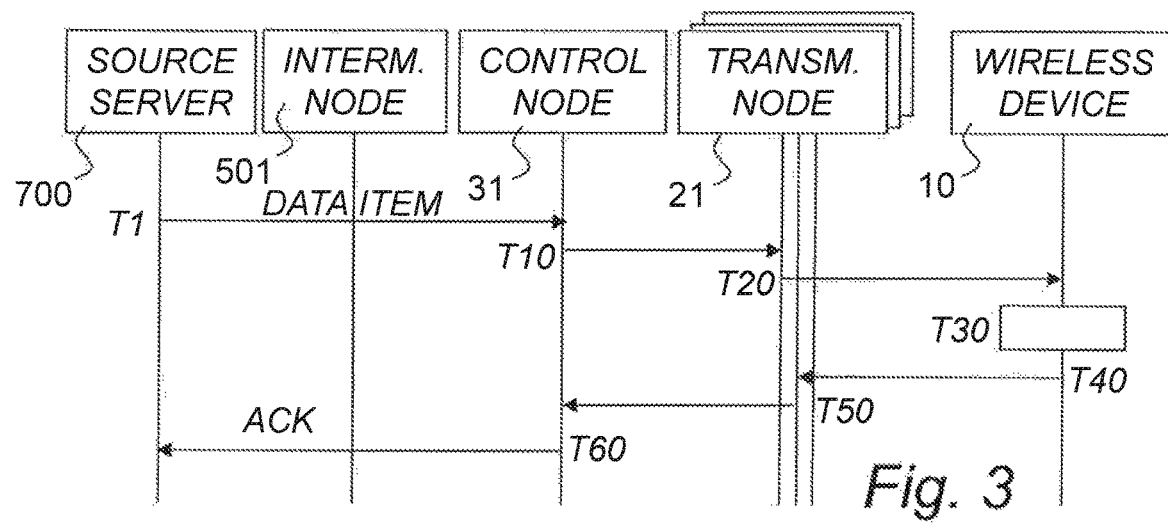
FIG. 3 is an illustration of an embodiment of a signalling scheme for a data item and an acknowledgement message.

One embodiment of a signalling scheme is illustrated schematically in FIG. 3. A data item is created by a source server 700 and is at T1 transmitted to a control node 31, optionally via an intermediate node 501. The control node 31 schedules the transmission and at T10 forwards the data item to a transmission node 21 out of a plurality of transmission nodes. At T20 the transmission node 21 transmits the data item to the wireless device 10, typically a UE. This DL transmission is thereby performed along a DL path, a first signalling path, involving one of the transmission nodes 21.

The wireless device 10 receives the data item over the first signalling path. The wireless device 10 also obtains signalling path information associated with the received data item. This signalling path information can be of different types.

One option is that information of the used first signalling path is attached to the data item. The wireless device 10 can then retrieve such information. Alternatively, the wireless device 10 may by itself recognize the first signalling path by other means and determine the identity of the first signalling path.

In another or a further alternative, the received data item could also be provided with an explicit request for selection of an acknowledgement return path. This request could refer to a predetermined agreement, or algorithm or could explicitly identify a certain return path.

The wireless device 10 determines at T30 a second signalling path, on which an acknowledgement message is intended to be sent. The selection of the second signalling path is dependent at least on the signalling path information. Additional information, such as signal properties of the received data item can also be used in the selection process. Examples of such signal properties are priority of the received data item, latency demands for the received data item and the source of the received data item. The wireless device 10 then initiates the transmission of an acknowledgement message over the selected second signalling path.

The acknowledgement message is sent at T40 to a transmission node 21, which according to the selected second signalling path can be the same as for the DL data item or another one. The transmission node 21 forwards the acknowledgement message at T50 to the control node 31, which in turn forwards the acknowledgement message to the source server 700. The control node 31 may use the reception of the acknowledgement message e.g. for delay alignment purposes.

Figure 4:
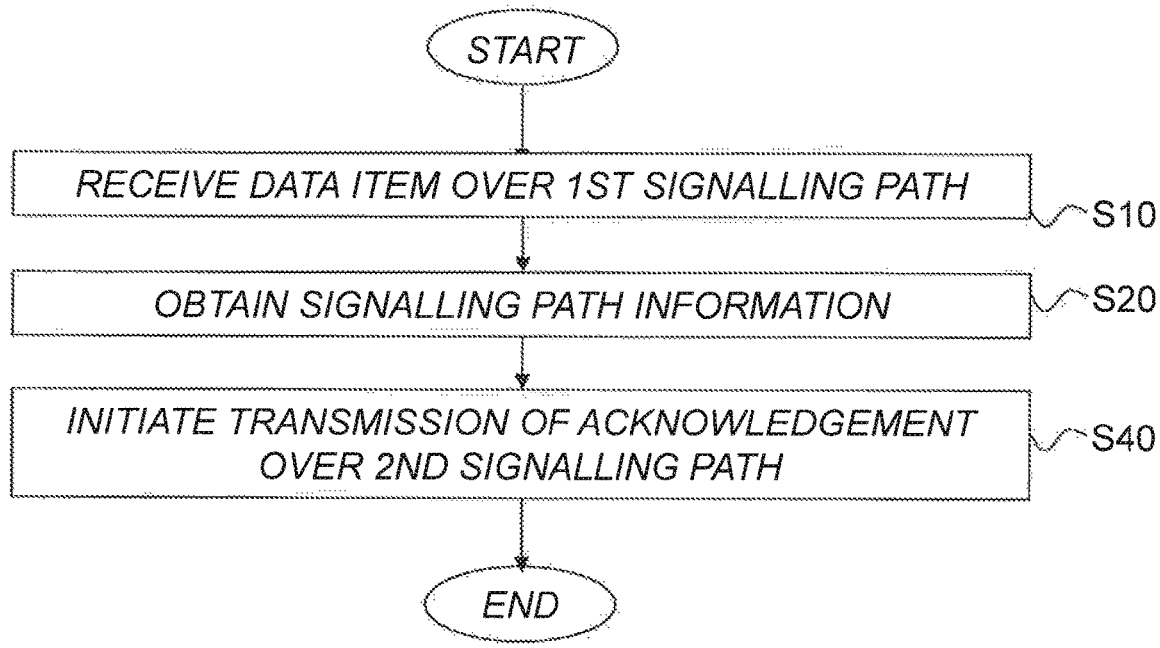
FIG. 4 is a flow diagram of steps of an embodiment of a method for controlling acknowledgement signalling in a multi-point communication system.

FIG. 4 illustrates a flow diagram of an embodiment of a method for controlling acknowledgement signalling in a multi-point communication system. In step S10, a data item is received in a wireless device over a first signalling path out of a plurality of possible signalling paths. In step S20, signalling path information associated with the received data item is obtained. In step S40, a transmission of an acknowledgement message for the data item is initiated over a second signalling path out of the plurality of possible signalling paths. This second signalling path is selected in dependence of the obtained signalling path information.

In one embodiment, the second signalling path is the same as the first signalling path.

In another embodiment, the second signalling path is different from the first signalling path.

Figure 5:
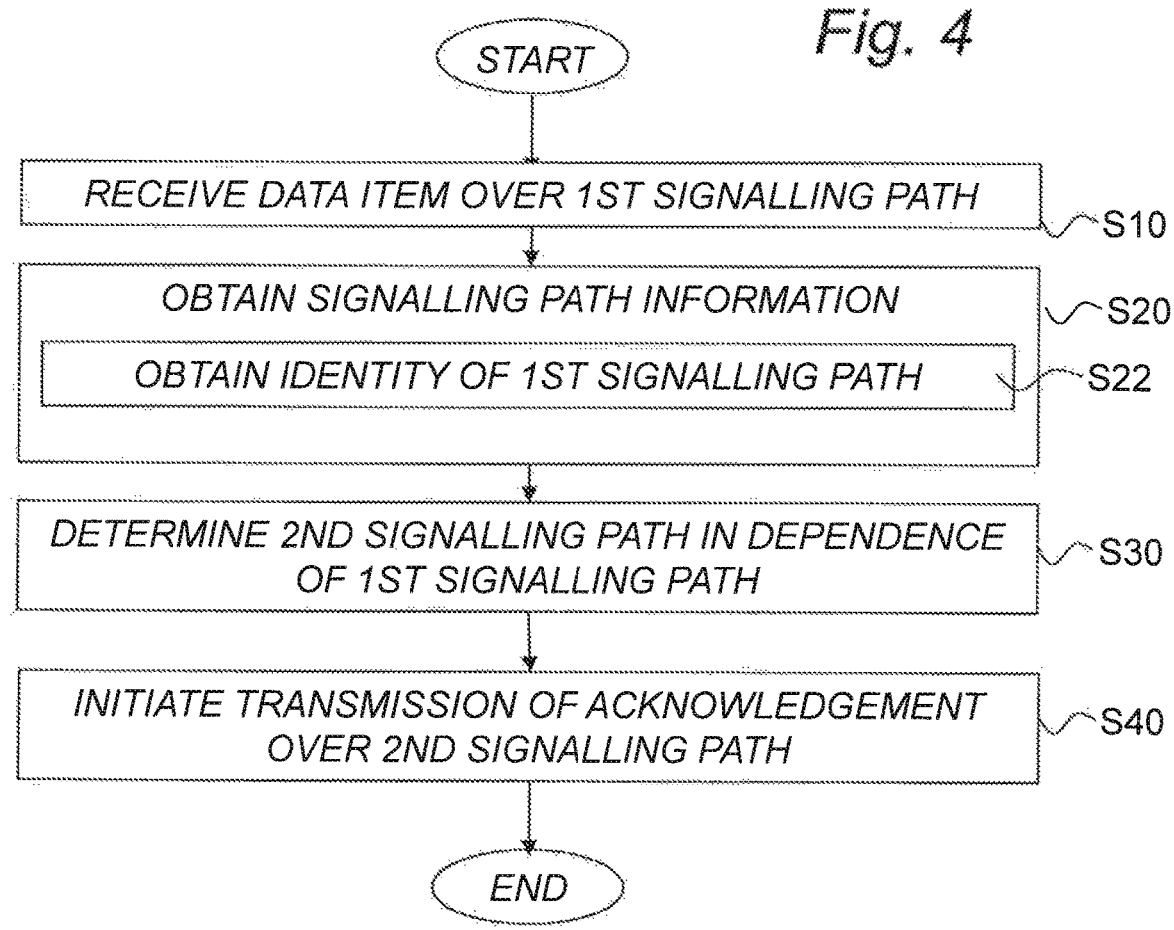
FIG. 5 is a flow diagram of steps of another embodiment of a method for controlling acknowledgement signalling in a multi-point communication system.

FIG. 5 illustrates a flow diagram of another embodiment of a method for controlling acknowledgement signalling in a multi-point communication system. Besides the steps that are common with the previous embodiment, this embodiment presents a step of obtaining S20 signalling path information, which comprises obtaining S22 of information about the identity of the first signalling path of the received data item. Furthermore, in step S30, the second signalling path, out of the plurality of possible signalling paths, is determined in dependence of the identity of the first signalling path.

In a further embodiment, the step S30 of determining the second signalling path can be performed in further dependency of signal properties of the received data item. Preferably, the signal properties are selected as at least one of a priority of the received data item, latency demands for the received data item, and the source of the received data item.

The step S22 of obtaining the identity of the first signalling path can be performed in different ways. One option is that the step of obtaining S22 information about the identity of the first signalling path comprises detection, in the wireless device, of a link on which the received data item was received. In other words, the wireless device makes its own detection.

Alternatively, the step of obtaining S22 information about the identity of the first signalling path may comprise retrieving of information about the identity of the first signalling path that is attached to the received data item.

This information about the identity of the first signalling path attached to the received data item may be provided at different stages in the signalling path. One alternative is that the source server of the received data item itself selects the DL path and includes information thereof into the data item. That requires that the source server has knowledge and authority to perform the selection of the DL path. Alternatively, the information can be entered by a node between the source server of the received data item and a node controlling assignments of signalling paths. A further alternative is that the information is added by the node controlling assignments of signalling paths, which is believed to be the most common alternative. Finally, also a transmitter node for the received data item could add first signalling path information. Also this alternative is believed to be an advantageous solution.

Figure 6:
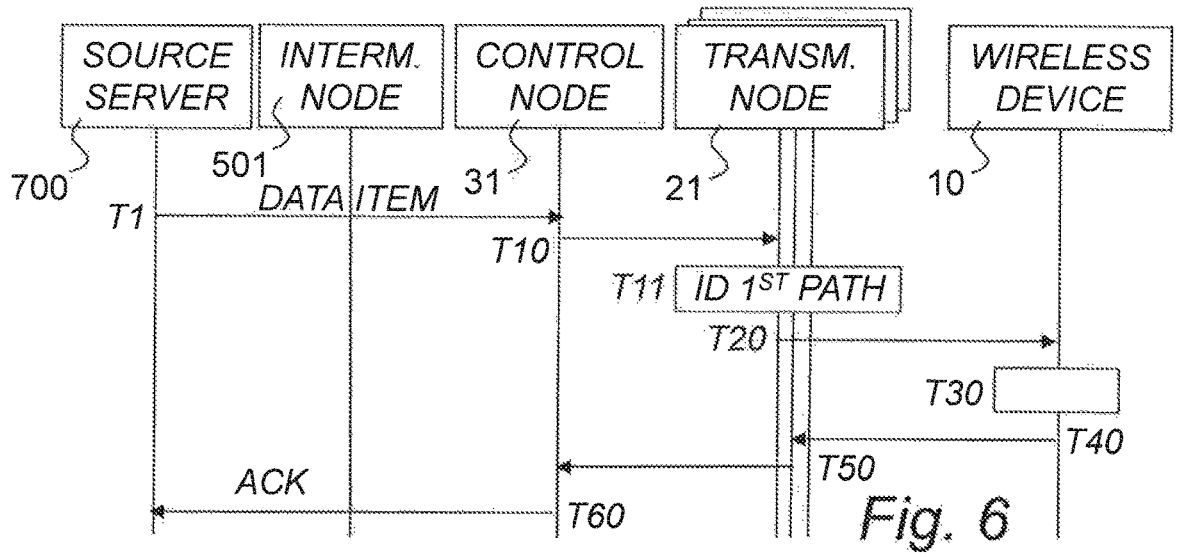
FIG. 6 is an illustration of another embodiment of a signalling scheme for a data item and an acknowledgement message.

A signalling scheme corresponding to such embodiments is illustrated schematically in FIG. 6. At the transmission node 21, at T11, an identification of the first signalling path is attached to the data item before the data item is transmitted to the wireless device 10.

Figure 7:
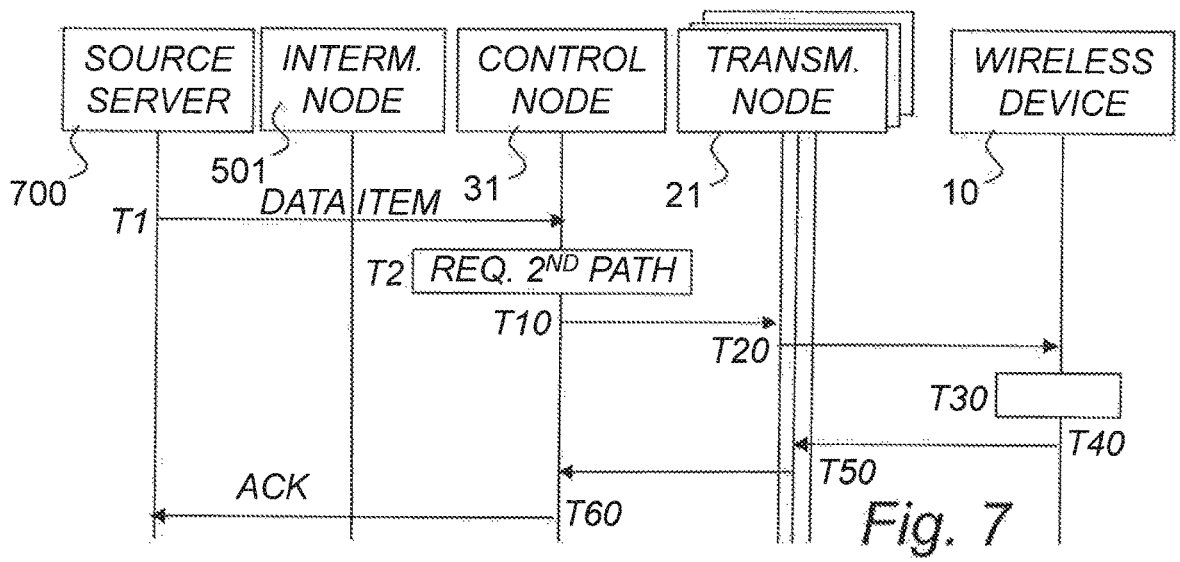
FIG. 7 is an illustration of yet another embodiment of a signalling scheme for a data item and an acknowledgement message.

FIG. 7 illustrates a signalling scheme of another alternative embodiment. In this embodiment, the control node 31 adds at T2 a request for a particular second signalling path to be selected. The request is attached to the data item and the wireless device 10 receives the request together with the data item as signalling path information. The initiation of the acknowledgement transmission can then be performed according to this request.

In other words, in one embodiment, the signalling path information comprises an identity of a particular signalling path to be selected as the second signalling path.

In one embodiment, the second signalling path is the same as the first signalling path.

In another embodiment, the second signalling path is different from the first signalling path.

The request for a particular signalling path for the acknowledgement reply can be provided at different stages in the signalling chain. One alternative is that the source server of the received data item itself selects the UL path and includes a request thereof into the data item. That requires that the source server has knowledge and authority to perform the selection of the UL path. Alternatively, the request can be entered by a node between the source server of the received data item and a node controlling assignments of signalling paths. A further alternative is that the request is added by the node controlling assignments of signalling paths, which is believed to be the most common alternative. Finally, also a transmitter node for the received data item could add a second signalling path request. Also this alternative is believed to be an advantageous solution.

Figure 8:
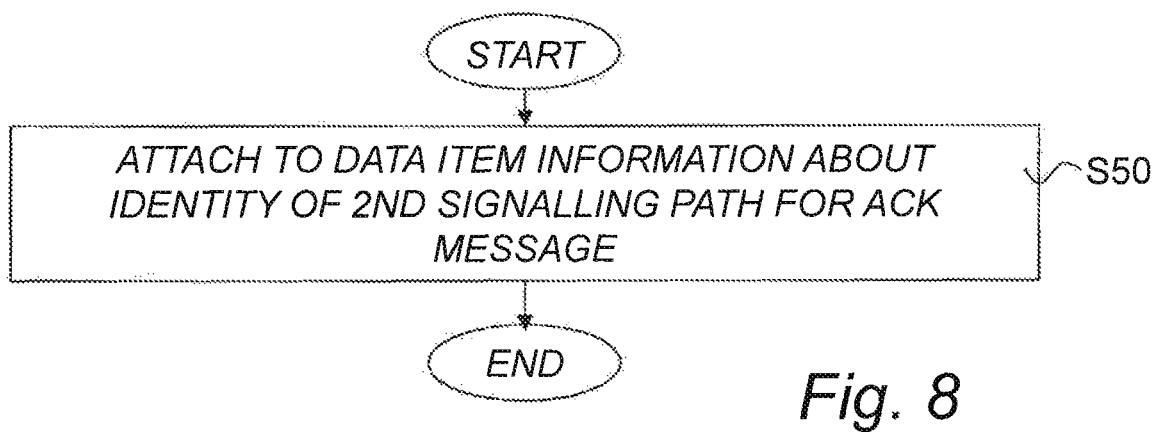
FIG. 8 is a flow diagram of steps of yet another embodiment of a method for controlling acknowledgement signalling in a multi-point communication system.

FIG. 8 illustrates a flow diagram of an embodiment of a method for assisting in controlling acknowledgement signalling in a multi-point communication system. Step S50, presents attaching, in a network node, to a data item, intended to be transmitted over a first signalling path out of a plurality of possible signalling paths, information about an identity of a particular signalling path to be selected as a second signalling path out of the plurality of possible signalling paths for an acknowledgement message for the data item.

All embodiments described so far have been directed to the control of the selection of the second signalling path. However, in further alternatives, the efforts in the signalling could instead be directed to collection of information of the second signalling path instead. Also, both such approaches can be applied simultaneously.

Figure 9:
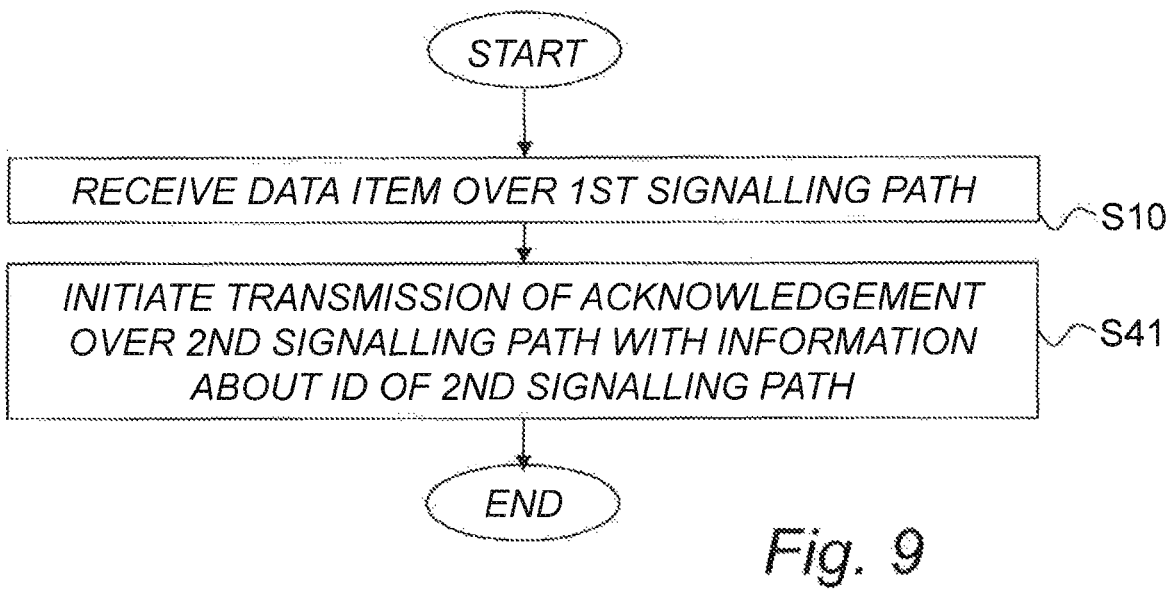
FIG. 9 is a flow diagram of steps of yet another embodiment of a method for controlling acknowledgement signalling in a multi-point communication system.

FIG. 9 illustrates a flow diagram of steps of an embodiment of a method for controlling acknowledgement signalling in a multi-point communication system. In step S10 a data item is received in a wireless device over a first signalling path out of a plurality of possible signalling paths. In step S41, a transmission of an acknowledgement message for the data item is initiated over a second signalling path out of the plurality of possible signalling paths. This initiating comprises attaching information of the identity of the second signalling path to the acknowledgement message.

Figure 10:
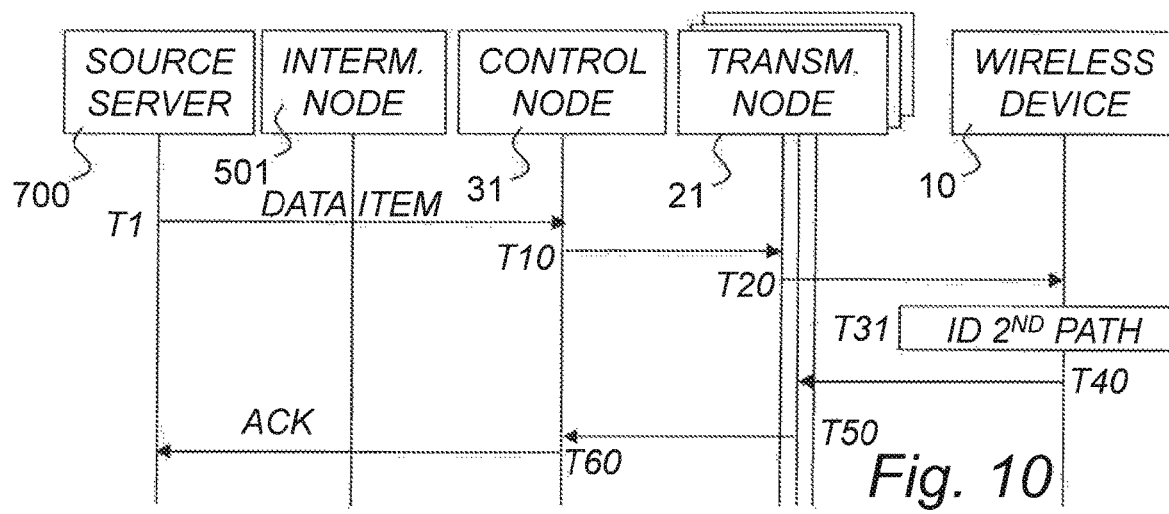
FIG. 10 is an illustration of yet another embodiment of a signalling scheme for a data item and an acknowledgement message.

A corresponding signalling scheme is illustrated in FIG. 10. At T31, the wireless device 10 attaches information about an ID of the second signalling path to the acknowledgement message. This ID can thereby be used by e.g. the control node for delay alignment purposes.

The step of attaching information of the identity of the second signalling path to the acknowledgement message can be triggered in different ways. In one alternative, the method comprises the further step of obtaining signal properties of the received data item. The signal properties can e.g. be selected from the priority of the received data item, latency demands for the received data item, and/or the source of the received data item. The attaching information of the identity of the second signalling path is then performed in dependence of the obtained signal properties.

As an alternative or as a complement, the method may also comprise the further step of obtaining signalling path information associated with the received data item. The attaching information of the identity of the second signalling path may then also be performed in dependence of the obtained signalling path information.

Figure 11:
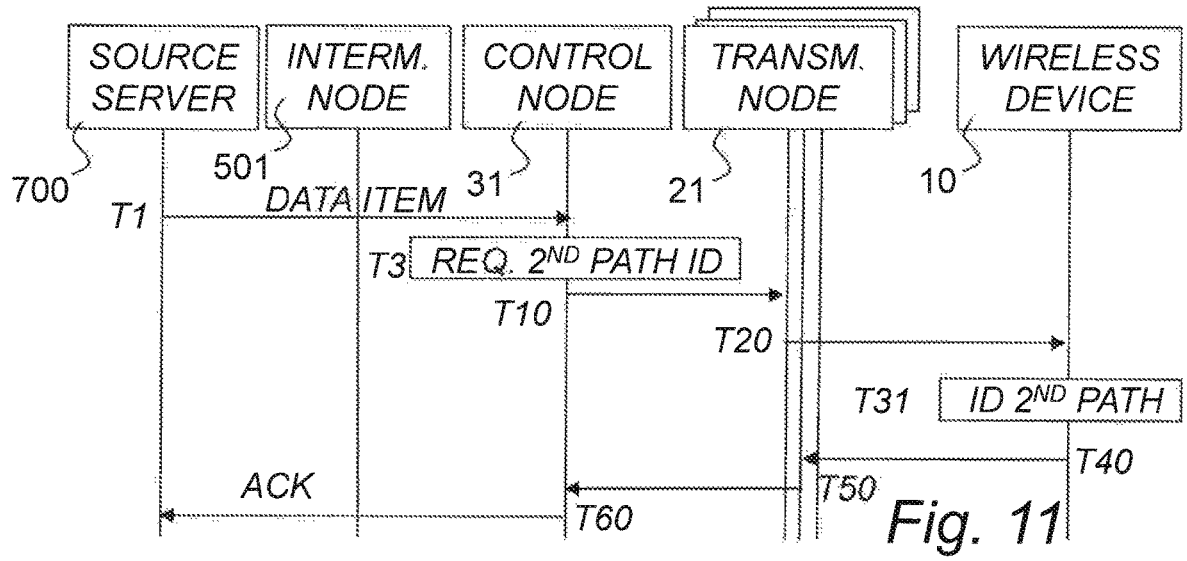
FIG. 11 is an illustration of yet another embodiment of a signalling scheme for a data item and an acknowledgement message.

In an alternative embodiment, the attachment of information about an ID of the second signalling path to the acknowledgement message can be explicitly requested. FIG. 11 illustrates a signalling scheme for such an embodiment. At T3, the control node 31 adds a request for having an identity of the second signalling path attached to the acknowledgement message to the original data item. This request is retrieved by the wireless device 10 and the identity is attached in the acknowledgement message.

In one embodiment of a method in a wireless device, a method of steps S10 and S41 may also comprise the additional step of obtaining an indication of a request for specifying a signalling path for acknowledgement messages. The attaching of information of the identity of the second signalling path is then performed as a response to the obtained indication of a request.

Figure 12:
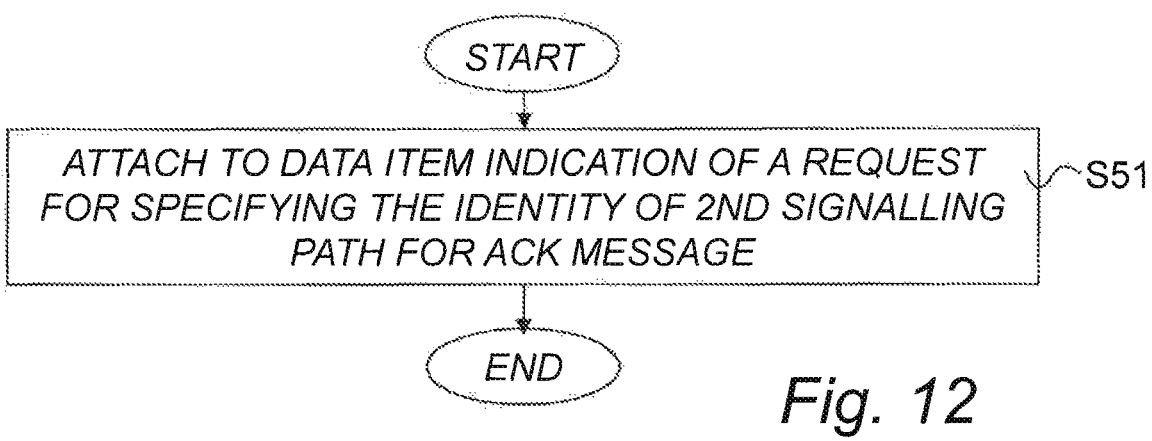
FIG. 12 is a flow diagram of steps of yet another embodiment of a method for controlling acknowledgement signalling in a multi-point communication system.

FIG. 12 illustrates a flow diagram of steps of an embodiment of a method for assisting in controlling acknowledgement signalling in a multi-point communication system. In step S51, there is presented to attach, in a network node, to a data item, intended to be transmitted over a first signalling path out of a plurality of possible signalling paths, an indication of a request for specifying a signalling path out of the plurality of possible signalling paths for acknowledgement messages.

The indication of a request for specifying a signalling path for acknowledgement messages can be added by different network nodes, in analogy with the signal path request described further above. One alternative is that the source server of the received data item itself requests a path ID in the acknowledgement message. Alternatively, the request can be entered by a node between the source server of the received data item and a node controlling assignments of signalling paths. A further alternative is that the request is added by the node controlling assignments of signalling paths, which is believed to be the most common alternative. Finally, also a transmitter node for the received data item could add such a request. Also this alternative is believed to be an advantageous solution.

Figure 13:
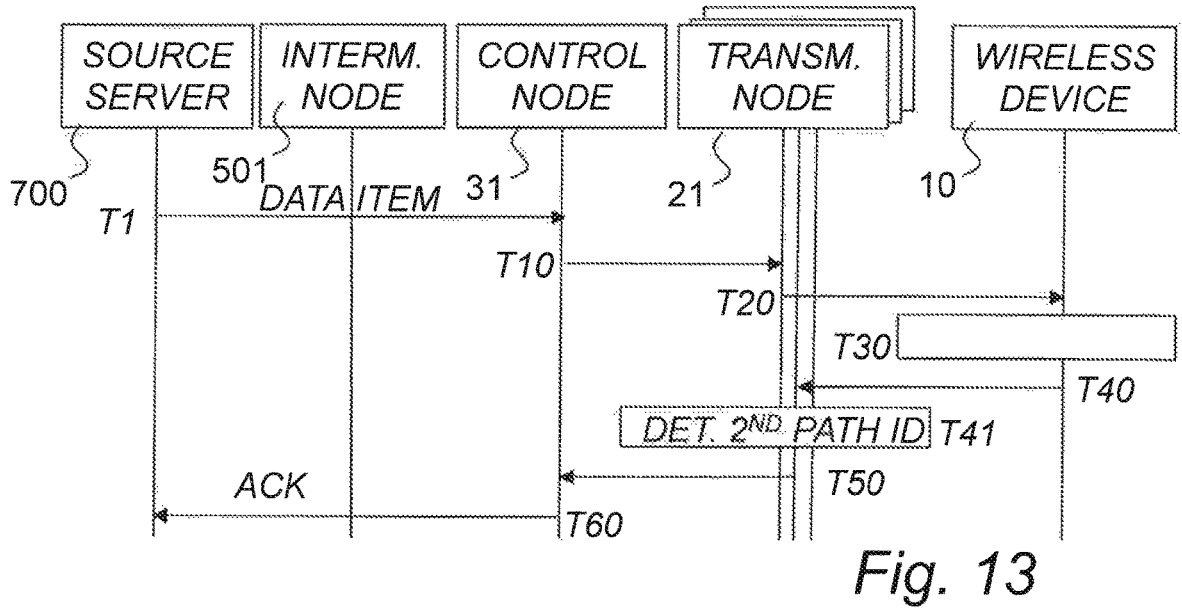
FIG. 13 is an illustration of yet another embodiment of a signalling scheme for a data item and an acknowledgement message.

A very crude solution of the information problem can also be solved as illustrated by the signalling scheme of FIG. 13. Here, the wireless device selects a second signalling path at T30. This can be performed in any way. During the transmission of the acknowledgement message back to the source server 700, in a network node, e.g. the transmission node 21 or the control node 31, the actual signal path for the acknowledgement message is detected, as illustrated by T41. Information about the identity of the second signalling path may thereby be attached to the acknowledge message.

Figure 14:
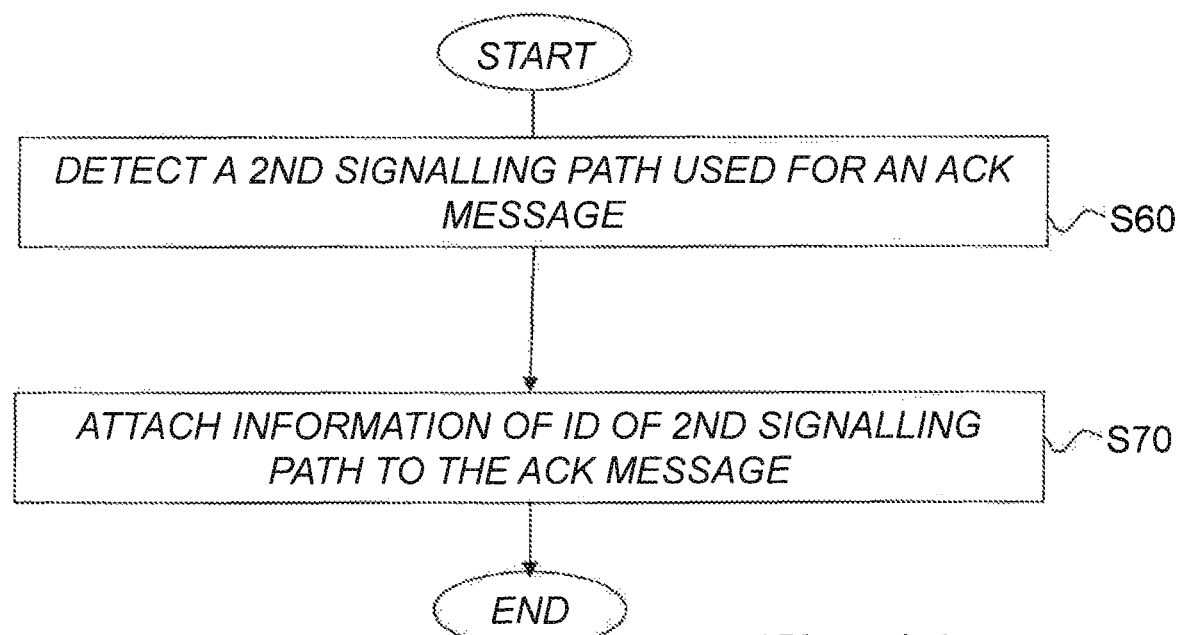
FIG. 14 is a flow diagram of steps of yet another embodiment of a method for controlling acknowledgement signalling in a multi-point communication system.

FIG. 14 illustrates a flow diagram of steps of an embodiment of a method for assisting in controlling acknowledgement signalling in a multi-point communication system. In step S60, it is presented to detect, in a network node, a second signalling path, out of a plurality of possible signalling paths, on which an acknowledgement message of a data item sent on a first signalling path, out of a plurality of possible signalling paths, was received. In step S70, information of the identity of the second signalling path is attached to the acknowledgement message.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a wireless device configured to control acknowledgement signalling in a multi-point communication system. The wireless device is configured to receive a data item over a first signalling path out of a plurality of possible signalling paths. The wireless device is further configured to obtain signalling path information associated with the received data item. The wireless device is further configured to initiate a transmission of an acknowledgement message for the data item over a second signalling path out of the plurality of possible signalling paths selected in dependence of the obtained signalling path information.

According to another aspect of the proposed technology there is provided a wireless device configured to control acknowledgement signalling in a multi-point communication system. The wireless device is configured to receive a data item over a first signalling path out of a plurality of possible signalling paths. The wireless device is further configured to initiate a transmission of an acknowledgement message for the data item over a second signalling path out of the plurality of possible signalling paths. The initiating comprises attaching information of the identity of the second signalling path to the acknowledgement message.

Figure 15:
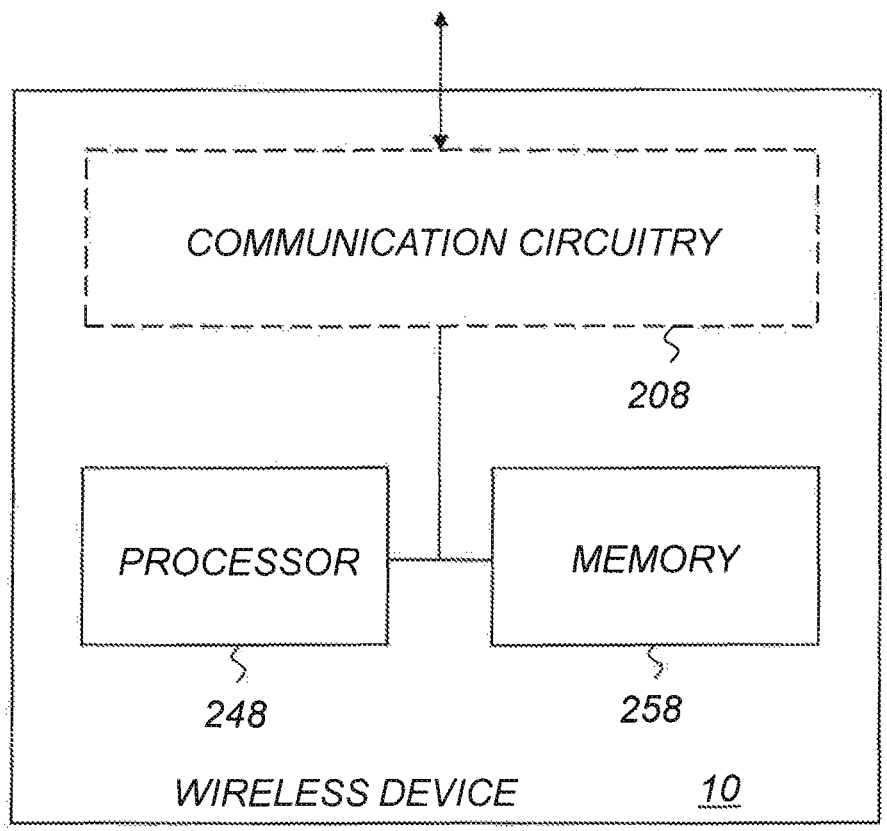
FIG. 15 is a schematic block diagram illustrating an embodiment of a wireless device.

FIG. 15 is a schematic block diagram illustrating an example of a wireless device 10, based on a processor-memory implementation according to an embodiment. In this particular example, the wireless device 10 comprises a processor 248 and a memory 258, the memory 258 comprises instructions executable by the processor 248.

The wireless device 10 also includes a communication circuitry 208. The communication circuitry 208 may include functions for wired and/or wireless communication with other devices and/or network nodes in the network. In a particular example, the communication circuitry 208 may be based on radio circuitry for communication with one or more other nodes, including transmitting and/or receiving information. The communication circuit 208 may be interconnected to the processor 248 and/or memory 258. By way of example, the communication circuit 208 may include any of the following: a receiver, a transmitter, a transceiver, input/output (I/O) circuitry, input port(s) and/or output port(s).

In one embodiment, the processor 248 is operative to obtain signalling path information associated with received data items. The wireless device is further configured to initiate a transmission of an acknowledgement message for the data item over a second signalling path out of the plurality of possible signalling paths selected in dependence of the obtained signalling path information.

In this embodiment, the communication circuit 208 is operative to receive a data item over a first signalling path out of a plurality of possible signalling paths.

In another embodiment, the processor 248 is operative to initiate a transmission of an acknowledgement message for a data item over a second signalling path out of the plurality of possible signalling paths. The initiating comprises attaching information of the identity of the second signalling path to the acknowledgement message.

In this embodiment, the communication circuit 208 is operative to receive a data item over a first signalling path out of a plurality of possible signalling paths.

According to another aspect of the proposed technology there is provided a network node configured to assist in controlling acknowledgement signalling in a multi-point communication system. The network node device is configured to attach to a data item, intended to be transmitted over a first signalling path out of a plurality of possible signalling paths, information about an identity of a particular signalling path to be selected as a second signalling path out of the plurality of possible signalling paths for an acknowledgement message for the data item.

According to yet another aspect of the proposed technology there is provided a network node configured to assist in controlling acknowledgement signalling in a multi-point communication system. The network node is configured to attach to a data item, intended to be transmitted over a first signalling path out of a plurality of possible signalling paths, an indication of a request for specifying a signalling path out of the plurality of possible signalling paths for acknowledgement messages.

According to yet another aspect of the proposed technology there is provided a network node configured to assist in controlling acknowledgement signalling in a multi-point communication system. The network node is configured to detect a link on which an acknowledgement message of a data item sent on a first signalling path out of a plurality of possible signalling paths was received. The network node is further configured to attach information of the identity of the link to the acknowledgement message.

Figure 16:
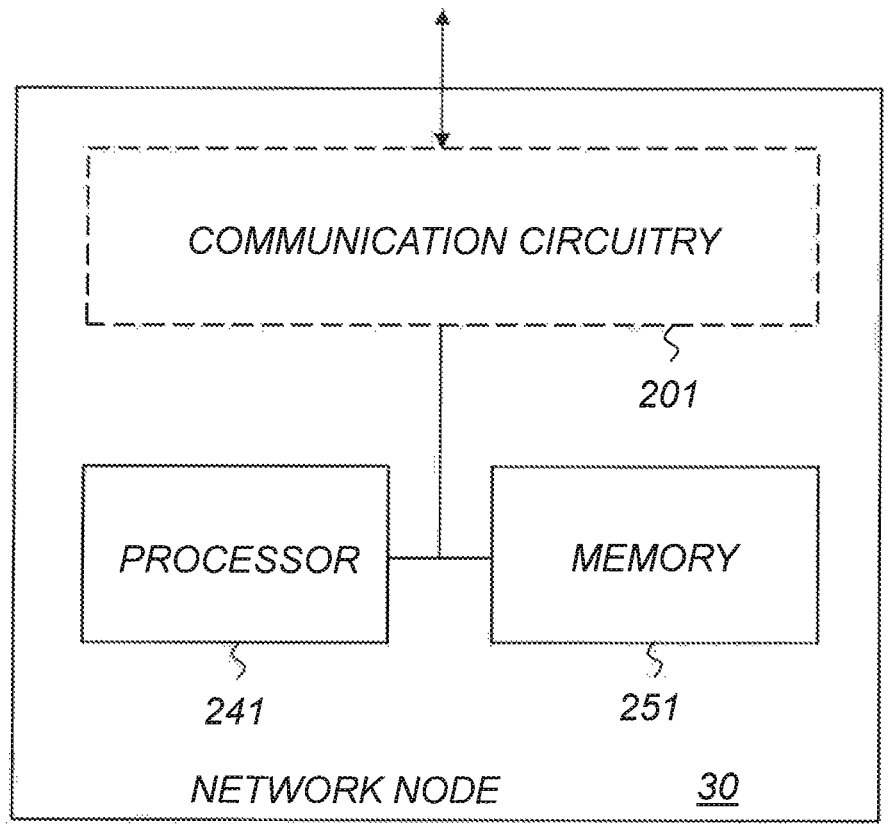
FIG. 16 is a schematic block diagram illustrating an embodiment of a network node.

FIG. 16 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241.

In one embodiment, the processor 241 is operative to attach to a data item, intended to be transmitted over a first signalling path out of a plurality of possible signalling paths, information about an identity of a particular signalling path to be selected as a second signalling path out of the plurality of possible signalling paths for an acknowledgement message for the data item.

In another embodiment, the processor 241 is operative to attach to a data item, intended to be transmitted over a first signalling path out of a plurality of possible signalling paths, an indication of a request for specifying a signalling path out of the plurality of possible signalling paths for acknowledgement messages.

In yet another embodiment, the processor 241 is operative to detect a link on which an acknowledgement message of a data item sent on a first signalling path out of a plurality of possible signalling paths was received. The processor 241 is further operative to attach information of the identity of the link to the acknowledgement message.

The network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s).

Figure 17:
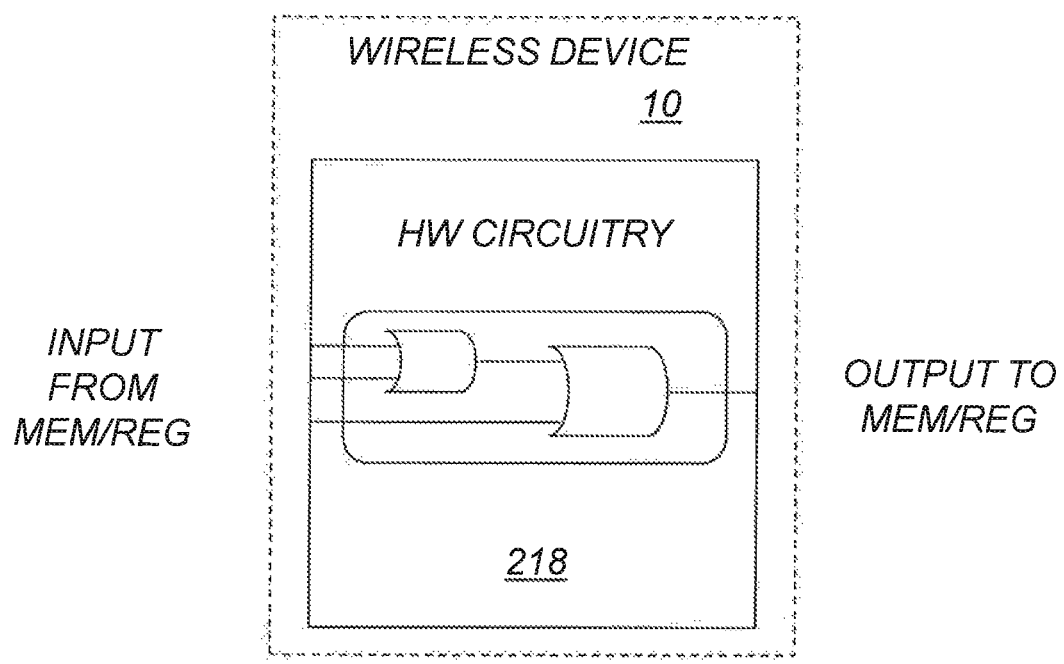
FIG. 17 is a schematic block diagram illustrating an embodiment of a wireless device based on a hardware circuitry implementation.

FIG. 17 is a schematic block diagram illustrating another example of a wireless device 10, based on a hardware circuitry implementation according to an embodiment. Particular examples of suitable hardware (HW) circuitry 218 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 18:
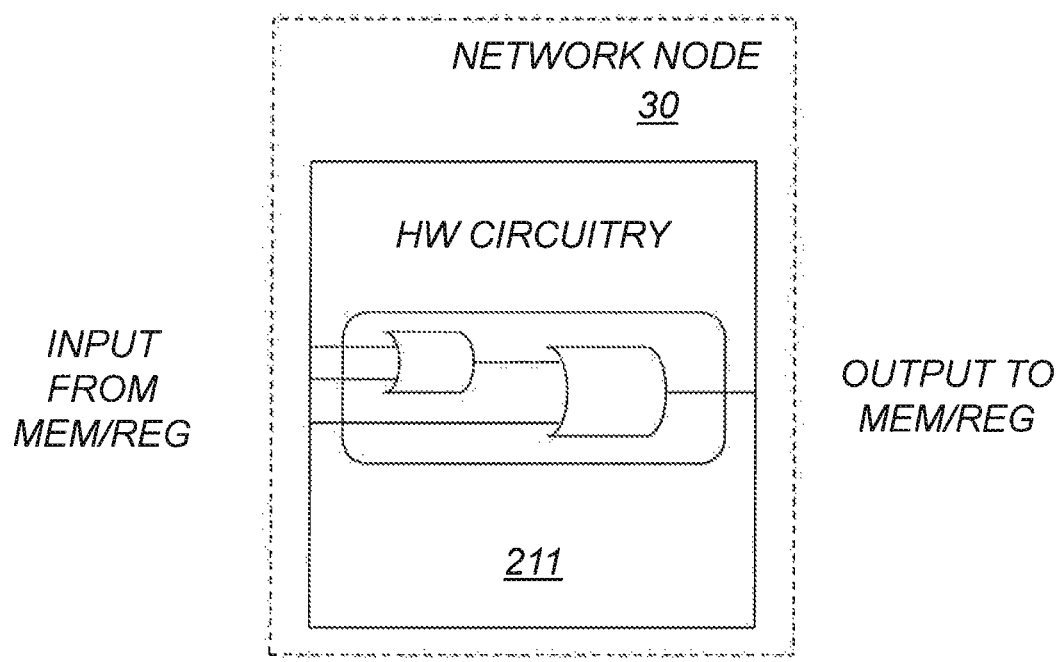
FIG. 18 is a schematic block diagram illustrating an embodiment of a network node based on a hardware circuitry implementation.

FIG. 18 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 19:
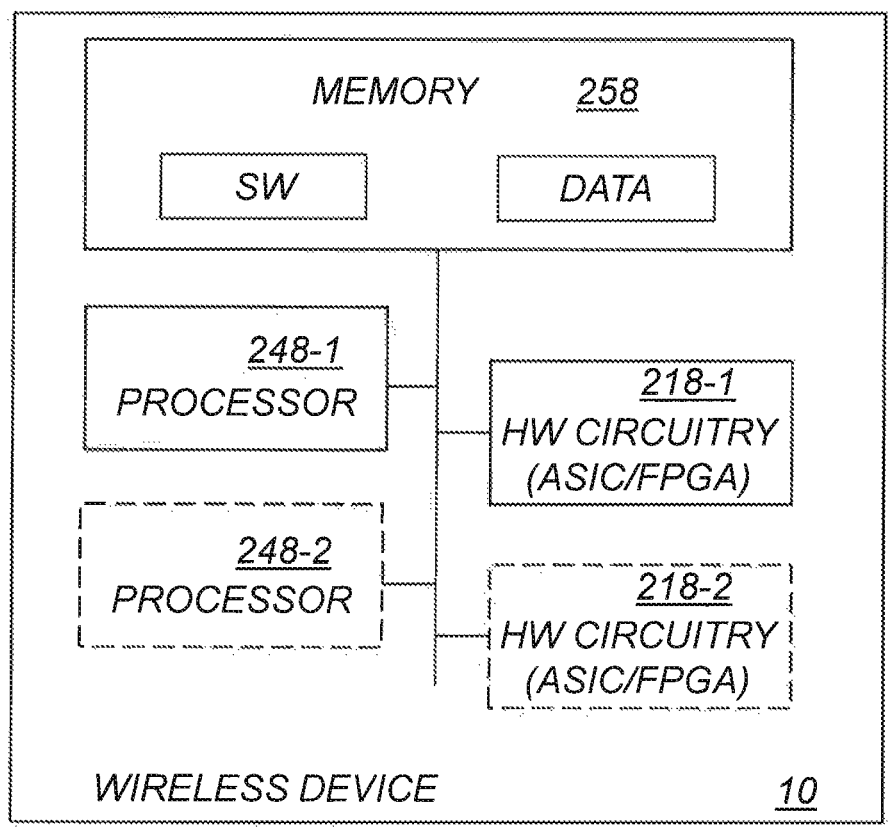
FIG. 19 is a schematic block diagram illustrating another embodiment of a wireless device based on combination of both processor and hardware circuitry.

FIG. 19 is a schematic block diagram illustrating yet another example of a wireless device 10, based on combination of both processor(s) 248-1, 248-2 and hardware circuitry 218-1, 218-2 in connection with suitable memory unit(s) 258. The wireless device 10 comprises one or more processors 248-1, 248-2, memory 258 including storage for software and data, and one or more units of hardware circuitry 218-1, 218-2 such as ASICs and/or FPGAs. The overall functionality is thus partitioned between programmed software (SW) for execution on one or more processors 248-1, 248-2, and one or more pre-configured or possibly reconfigurable hardware circuits 218-1, 218-2 such as ASICs and/or FPGAs. The actual hardware-software partitioning can be decided by a system designer based on a number of factors including processing speed, cost of implementation and other requirements.

Figure 20:
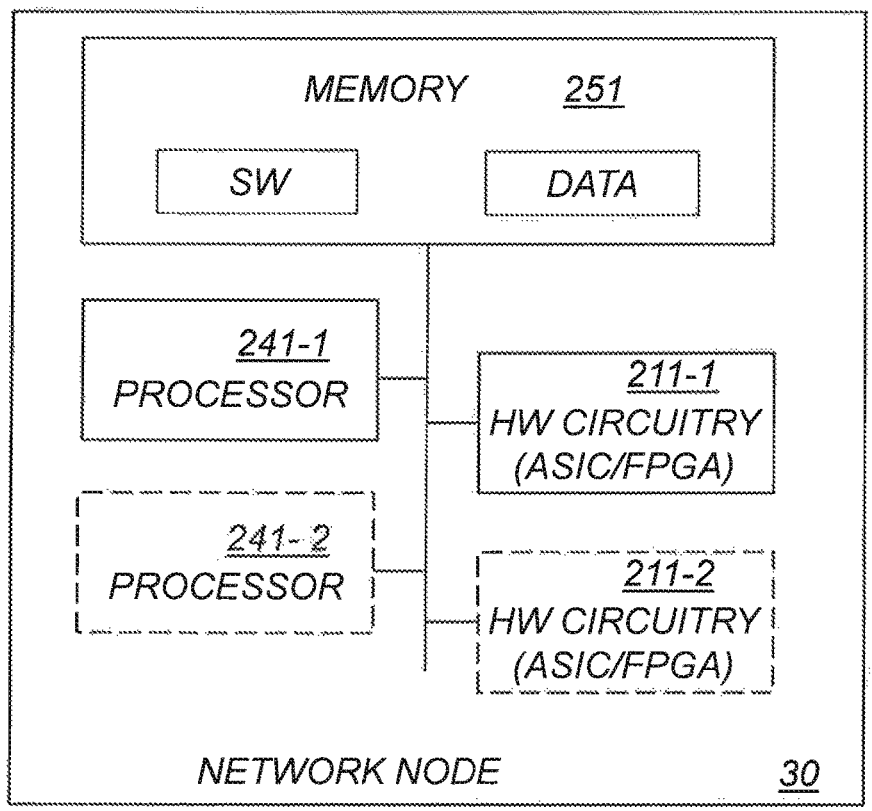
FIG. 20 is a schematic block diagram illustrating another embodiment of a network node based on combination of both processor and hardware circuitry.

FIG. 20 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 21:
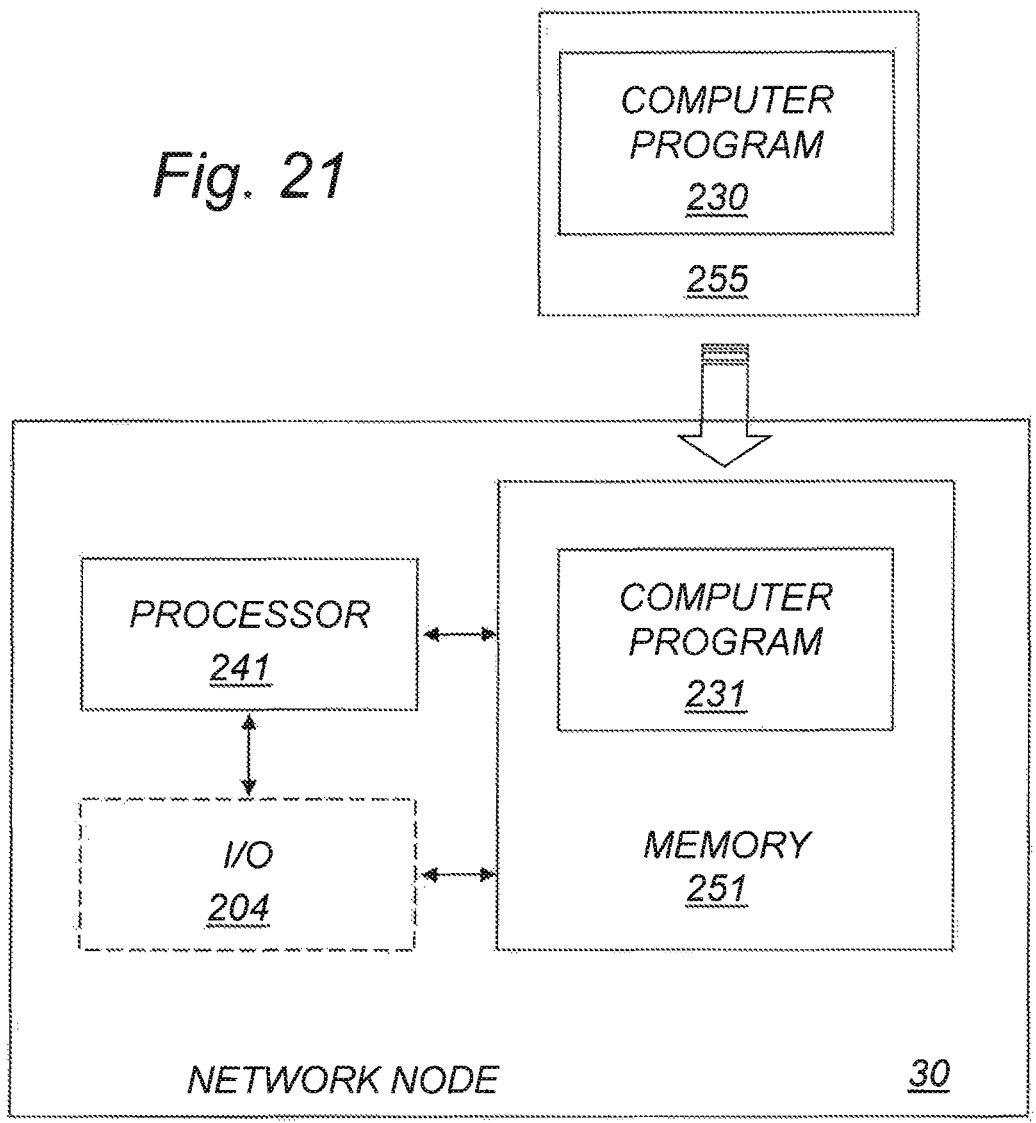
FIG. 21 is a schematic diagram illustrating an embodiment of a computer-implementation of a network node.

FIG. 21 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In yet another particular embodiment, the computer program 231 comprises instructions, which when executed by at least one processor 241, cause the processor(s) 241 to attach to a data item, intended to be transmitted over a first signalling path out of a plurality of possible signalling paths, information about an identity of a particular signalling path to be selected as a second signalling path out of the plurality of possible signalling paths for an acknowledgement message for the data item.

In a particular embodiment, the computer program 231 comprises instructions, which when executed by at least one processor 241, cause the processor(s) 241 to attach to a data item, intended to be transmitted over a first signalling path out of a plurality of possible signalling paths, an indication of a request for specifying a signalling path out of the plurality of possible signalling paths for acknowledgement messages.

In another particular embodiment, the computer program 231 comprises instructions, which when executed by at least one processor 241, cause the processor(s) 241 to detect a second signalling path, out of a plurality of possible signalling paths, on which an acknowledgement message of a data item sent on a first signalling path, out of a plurality of possible signalling paths, was received; the instructions, when executed by at least one processor (241), further cause the at least one processor (241) to attach information of the identity of the second signalling path to the acknowledgement message.

Figure 22:
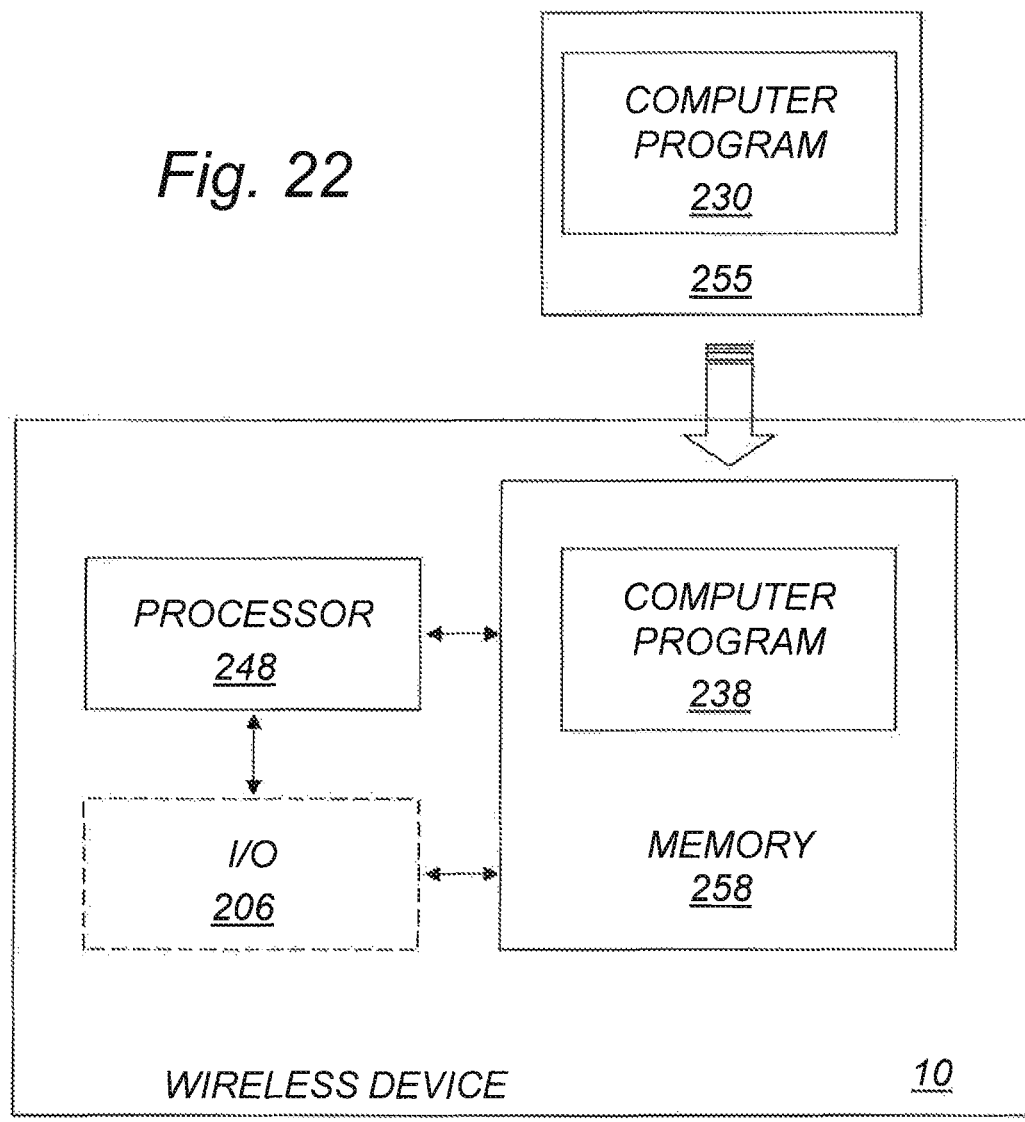
FIG. 22 is a schematic diagram illustrating an embodiment of a computer-implementation of a wireless device.

FIG. 22 is a schematic diagram illustrating an embodiment of a computer-implementation of a wireless device 10. In this particular embodiment, at least some of the steps, functions, procedures, modules and/or blocks described herein are implemented in a computer program 238, which is loaded into the memory 258 for execution by processing circuitry including one or more processors 248. The processor(s) 248 and memory 258 are interconnected to each other to enable normal software execution. An optional input/output device 206 may also be interconnected to the processor(s) 248 and/or the memory 258 to enable input and/or output of relevant data such as input parameter(s) and/or resulting output parameter(s).

In a particular embodiment, the computer program 238 comprises instructions, which when executed by at least one processor 248, cause the processor(s) 248 to receive a data item over a first signalling path out of a plurality of possible signalling paths; to obtain signalling path information associated with the received data item, and to initiate a transmission of an acknowledgement message for the data item over a second signalling path out of the plurality of possible signalling paths selected in dependence of the obtained signalling path information.

In a particular embodiment, the computer program 238 comprises instructions, which when executed by at least one processor 248, cause the processor(s) 248 to receive a data item over a first signalling path out of a plurality of possible signalling paths, and to initiate a transmission of an acknowledgement message for the data item over a second signalling path out of the plurality of possible signalling paths, the initiating comprising attaching information of the identity of the second signalling path to the acknowledgement message.

By way of example, the software or computer program 230; 231, 238 may be realized as a computer program product, which is normally carried or stored on a computer-readable medium 255; 251, 258, in particular a non-volatile medium.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231, 238 may be realized as a computer program product, which is normally carried or stored on a computer-readable medium 255; 251, 258, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 23:
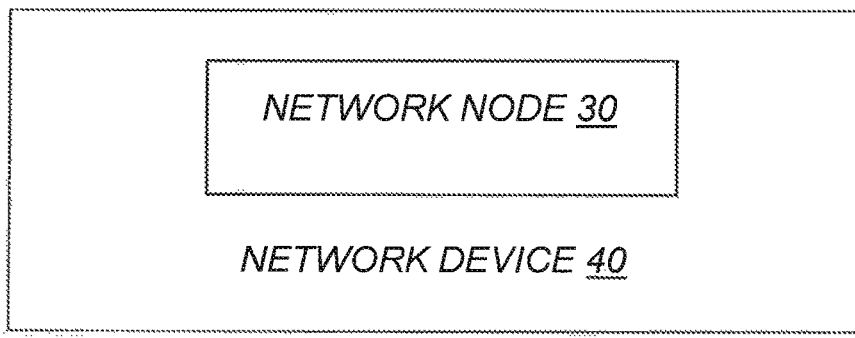
FIG. 23 is a schematic block diagram illustrating an embodiment of a network device.

FIG. 23 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 24:
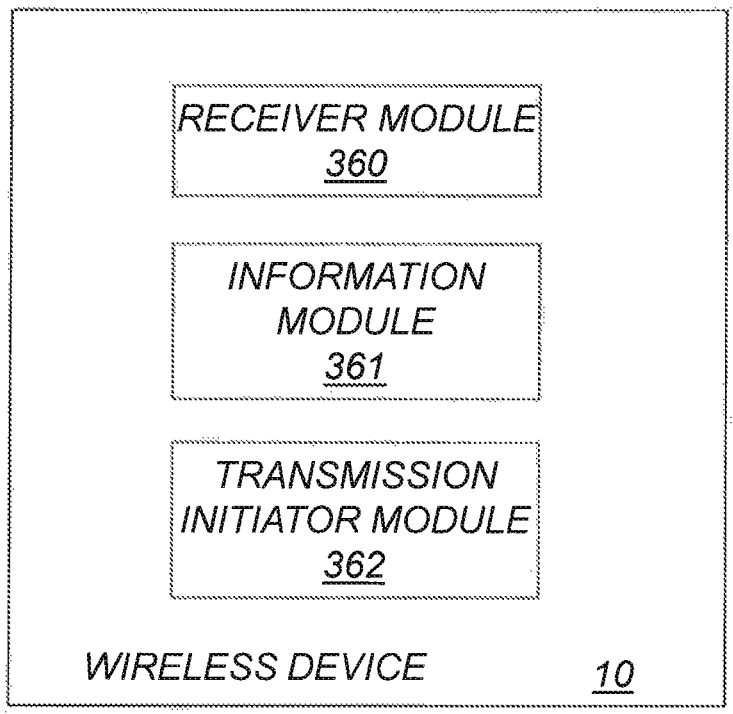
FIG. 24 is a schematic diagram illustrating an embodiment of a wireless device.

FIG. 24 is a schematic diagram illustrating an example of a wireless device for controlling acknowledgement signalling in a multi-point communication system. The wireless device 10 comprises a receiver module 360 for receiving a data item over a first signalling path out of a plurality of possible signalling paths. The wireless device 10 further comprises an information module 361 for obtaining signalling path information associated with the received data item. The wireless device 10 further comprises a transmission initiator module 362 for initiating a transmission of an acknowledgement message for the data item over a second signalling path out of the plurality of possible signalling paths selected in dependence of the obtained signalling path information.

Figure 25:
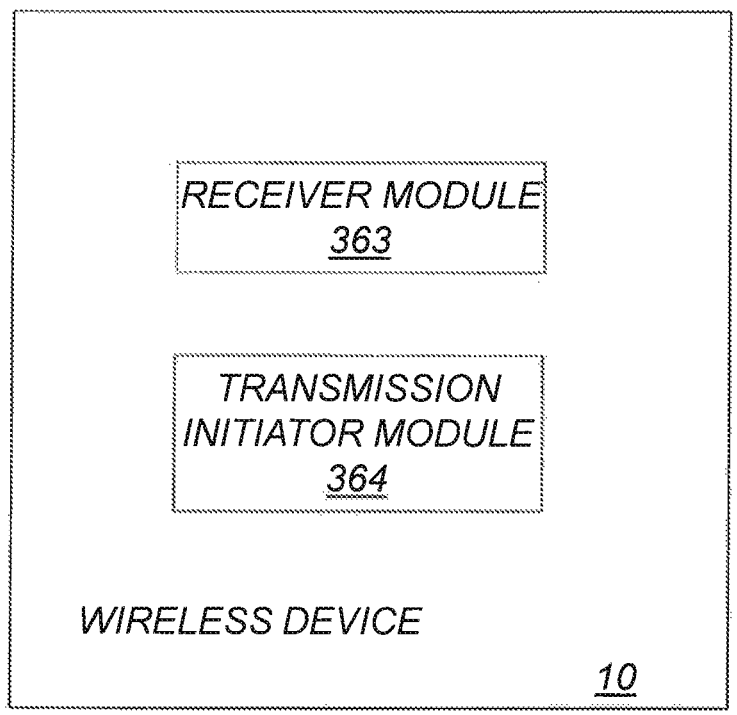
FIG. 25 is a schematic diagram illustrating another embodiment of a wireless device.

FIG. 25 is a schematic diagram illustrating an example of a wireless device for controlling acknowledgement signalling in a multi-point communication system. The wireless device 10 comprises a receiver module 363 for receiving a data item over a first signalling path out of a plurality of possible signalling paths. The wireless device 10 further comprises a transmission initiator module 364 for initiating a transmission of an acknowledgement message for the data item over a second signalling path out of the plurality of possible signalling paths. The initiating comprises attaching information of the identity of the second signalling path to the acknowledgement message.

Figure 26:
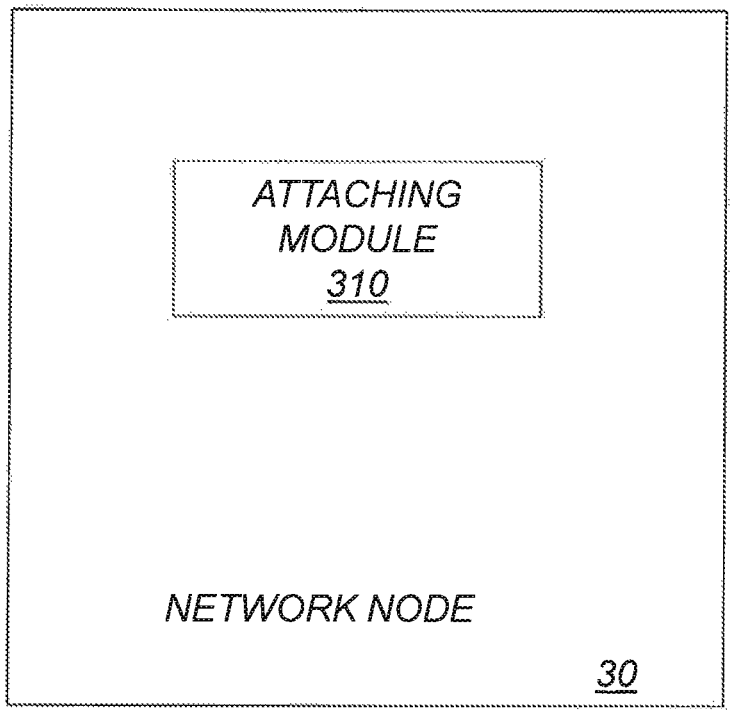
FIG. 26 is a schematic diagram illustrating an embodiment of a network node.

FIG. 26 is a schematic diagram illustrating an example of a network node 30 for assisting in controlling acknowledgement signalling in a multi-point communication system. The network node 30 comprises an attaching module 310 for attaching to a data item, intended to be transmitted over a first signalling path out of a plurality of possible signalling paths, information about an identity of a particular signalling path to be selected as a second signalling path out of the plurality of possible signalling paths for an acknowledgement message for the data item.

Figure 27:
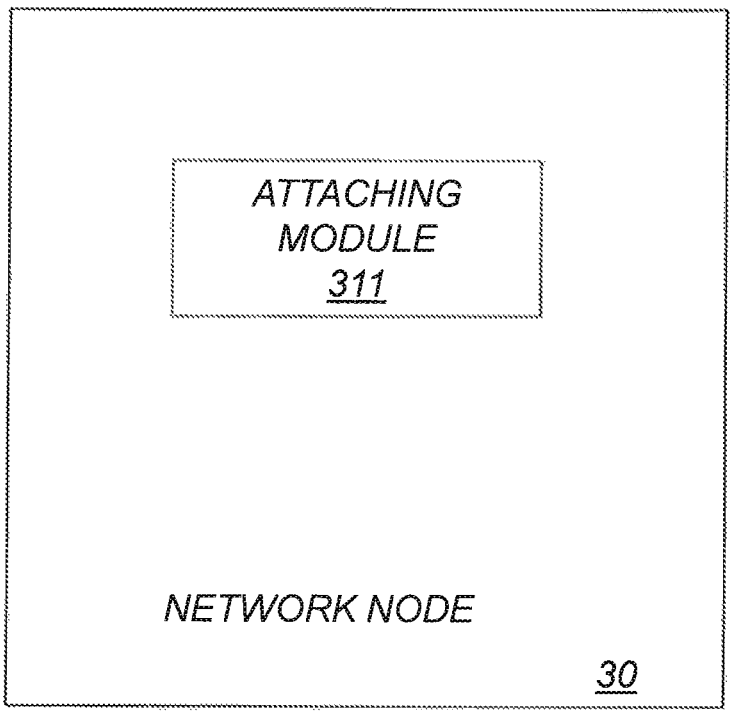
FIG. 27 is a schematic diagram illustrating another embodiment of a network node.

FIG. 27 is a schematic diagram illustrating an example of a network node 30 for assisting in controlling acknowledgement signalling in a multi-point communication system. The network node 30 comprises an attaching module 311 for attaching to a data item, intended to be transmitted over a first signalling path out of a plurality of possible signalling paths, an indication of a request for specifying a signalling path out of the plurality of possible signalling paths for acknowledgement messages.

Figure 28:
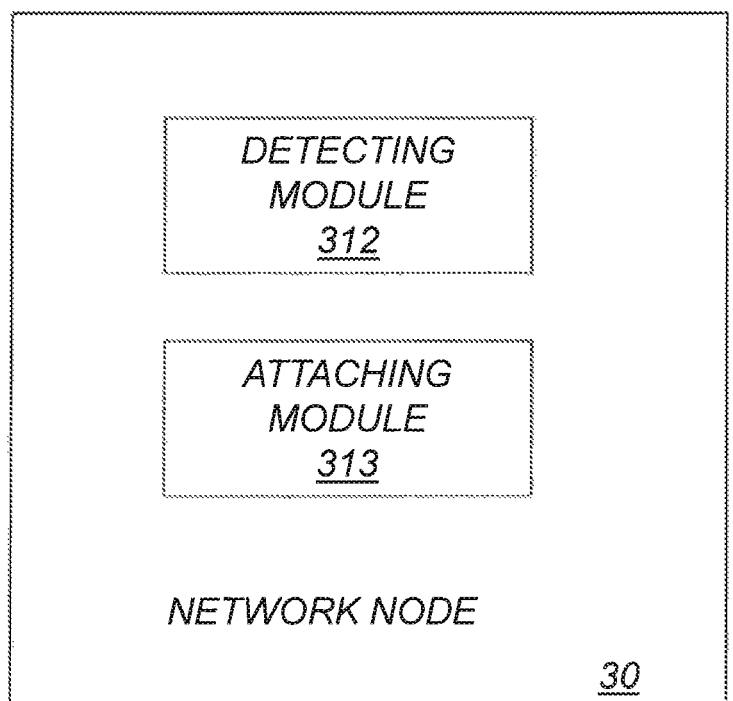
FIG. 28 is a schematic diagram illustrating yet another embodiment of a network node.

FIG. 28 is a schematic diagram illustrating an example of a network node 30 for assisting in controlling acknowledgement signalling in a multi-point communication system. The network node 30 comprises a detecting module 312 for detecting a second signalling path, out of a plurality of possible signalling paths, on which an acknowledgement message of a data item sent on a first signalling path, out of a plurality of possible signalling paths, was received. The network node 30 further comprises an attaching module 313 for attaching information of the identity of the second signalling path to the acknowledgement message.

Alternatively it is possible to realize the module(s) in FIGS. 24 to 28 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centres, in other scenarios it may in fact be beneficial to distribute functionality over different parts of the network.

Figure 29:
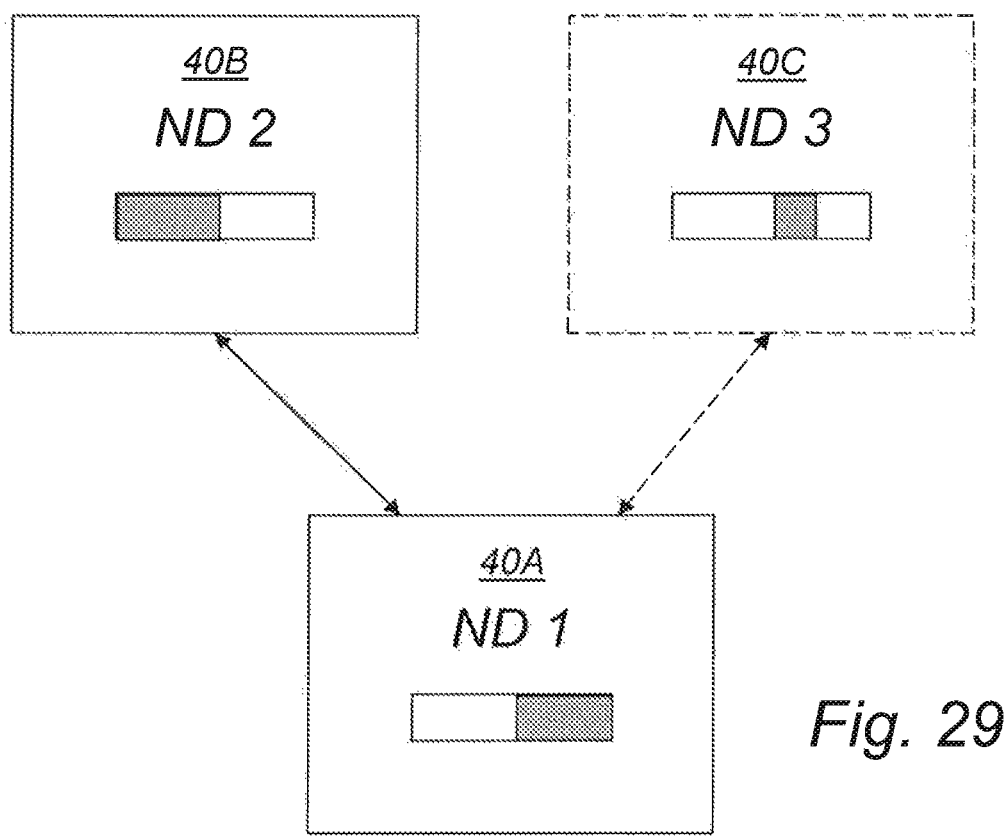
FIG. 29 is a schematic diagram illustrating a general example of functionality distribution or partition.

FIG. 29 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 30:
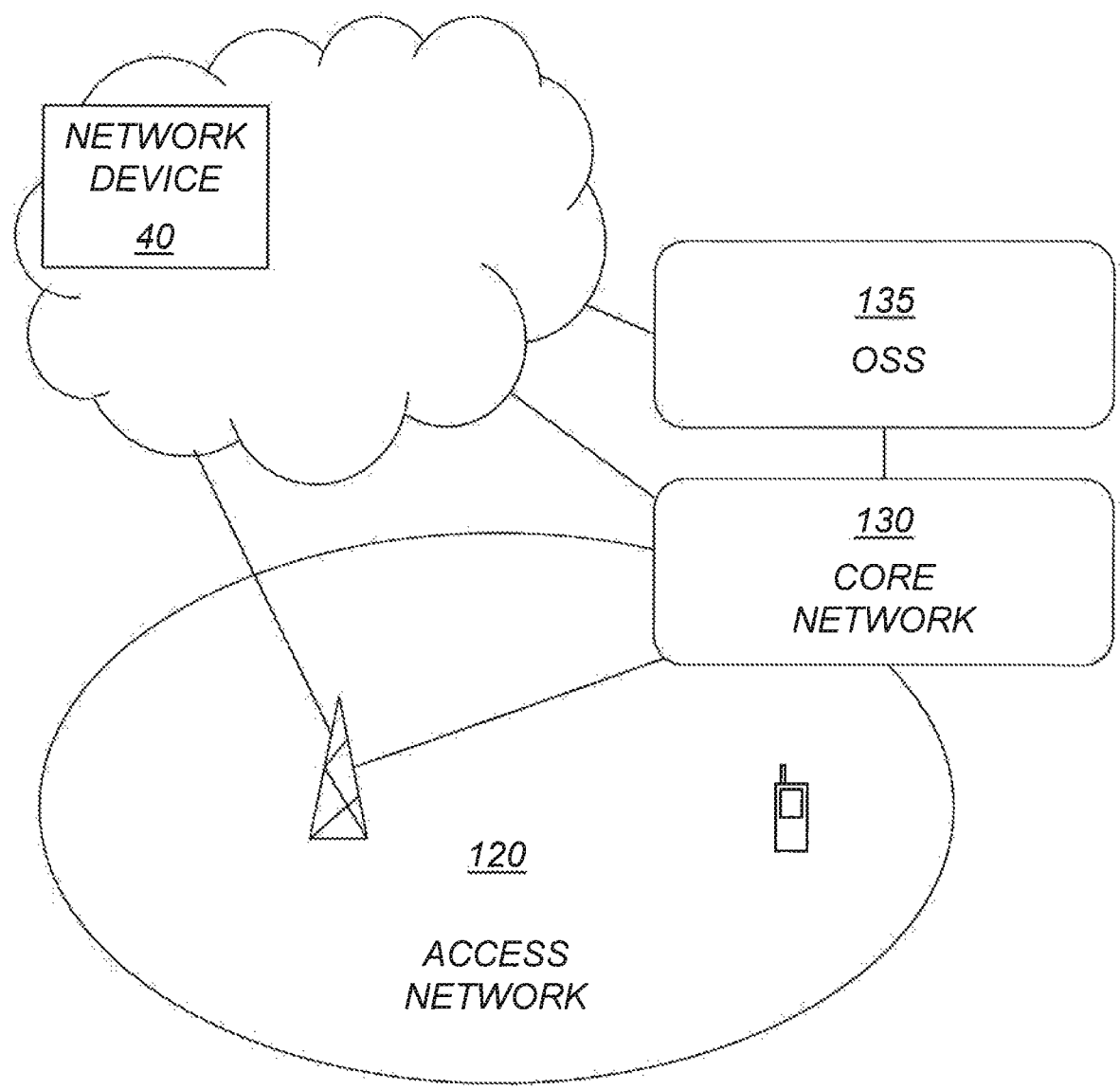
FIG. 30 is a schematic diagram illustrating an example of a wireless communication system in cooperation with one or more cloud-based network devices.

FIG. 30 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centres, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 31:
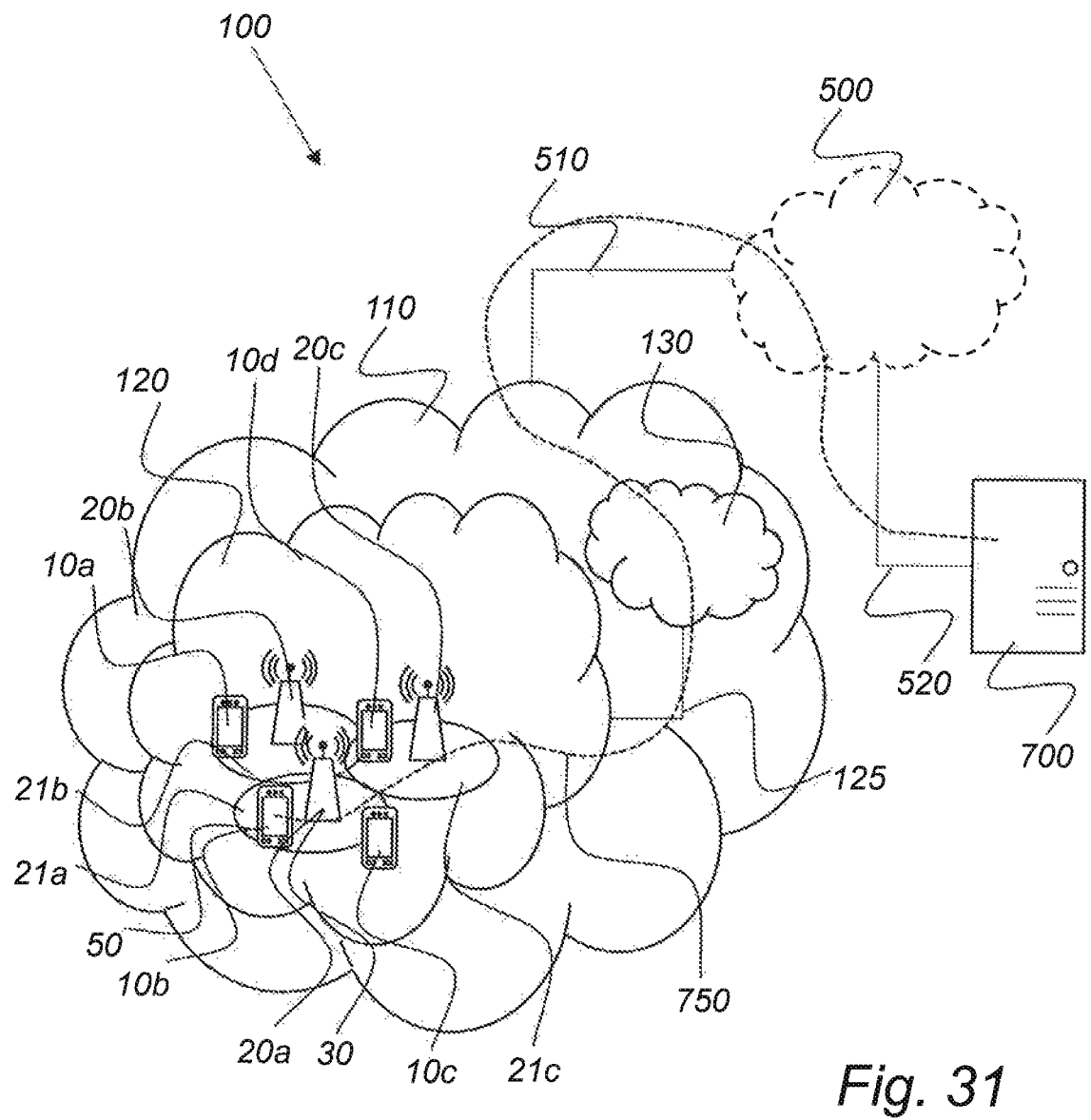
FIG. 31 schematically illustrates a telecommunication network connected via an intermediate network to a host computer.

With reference to FIG. 31, in accordance with an embodiment, a communication system 100 includes a telecommunication network 110, such as a 3GPP-type cellular network, which comprises an access network 120, such as a Radio Access Network (RAN), and a Core Network (CN) 130. The access network 120 comprises a plurality of base stations 20a, 20b, 20c, such as Node Bs (NB), evolved Node Bs (eNB), New Radio Node Bs (gNB) or other types of wireless access points, each defining a corresponding coverage area 21a, 21b, 21c. Each base station 20a, 20b, 20c is connectable to the CN 130 over a wired or wireless connection 125. A first user equipment (UE) 10a located in coverage area 21c is configured to wirelessly connect to, or be paged by, the corresponding base station 20c. A second UE 10b in coverage area 21a is wirelessly connectable to the corresponding base station 20a. While a plurality of UEs 10a-d are illustrated in this example, the disclosed embodiments are equally applicable to a situation where a sole UE is in the coverage area or where a sole UE is connecting to the corresponding base station 20.

The base station 20 is one type of a network node 30. Many operations that in a typical applications are performed in a base station 20 may alternatively be performed in another network node 30 or even in a node external to the telecommunication network 110. The devices and methods described here below as being performed in a base station 20 should be interpreted as also being possible to perform in a general network node 30.

The UE 10 is one type of a wireless device 11. Many operations that in a typical applications are performed in a UE 10 may alternatively be performed in any other wireless device 11. The devices and methods described here below as being performed in a UE 10 should be interpreted as also being possible to perform in a general wireless device 11.

The telecommunication network 110 is itself connected to a host computer or source server 700, which may be embodied in the hardware and/or software of a standalone server, a cloud implemented server, a distributed server or as processing resources in a server farm. The host computer or source server 700 may be under the ownership or control of a service provider, or may be operated by the service provider or on behalf of the service provider. The connections 510, 520 between the telecommunication network 110 and the host computer or source server 700 may extend directly from the CN 130 to the host computer or source server 700 or may go via an optional intermediate network 500. The intermediate network 500 may be one of, or a combination of more than one of, a public, private or hosted network; the intermediate network 500, if any, may be a backbone network or the Internet; in particular, the intermediate network 500 may comprise two or more subnetworks (not shown).

The communication system of FIG. 31 as a whole enables connectivity between one of the connected UEs 10a-d and the host computer or source server 700. The connectivity may be described as an over-the-top (OTT) connection 750. The host computer or source server 700 and the connected UEs 10a-d are configured to communicate data and/or signalling via the OTT connection 750, using the access network 120, the CN 130, any intermediate network 500 and possible further infrastructure (not shown) as intermediaries.

The OTT connection 750 may be transparent in the sense that the participating communication devices through which the OTT connection 750 passes are unaware of routing of uplink and downlink communications. For example, a base station 20 may not or need not be informed about the past routing of an incoming downlink communication with data originating from a host computer or source server 700 to be forwarded (e.g., handed over) to a connected UE 10. Similarly, the base station 20 need not be aware of the future routing of an outgoing uplink communication originating from the UE towards the host computer or source server 700.

Example implementations, in accordance with an embodiment, of the UE, base station and host computer discussed in the preceding paragraphs will now be described with reference to FIG. 32. In a communication system 100, a host computer or source server 700 comprises hardware 710 including a communication interface 730 configured to set up and maintain a wired or wireless connection with an interface of a different communication device of the communication system 100. The host computer or source server 700 further comprises processing circuitry 740, which may have storage and/or processing capabilities. In particular, the processing circuitry 740 may comprise one or more programmable processors, application-specific integrated circuits, field programmable gate arrays or combinations of these (not shown) adapted to execute instructions. The host computer or source server 700 further comprises software 720, which is stored in or accessible by the host computer 700 and executable by the processing circuitry 740. The software 720 includes a host application 722. The host application 722 may be operable to provide a service to a remote user, such as a UE 10 connecting via an OTT connection 750 terminating at the UE 10 and the host computer or source server 700. In providing the service to the remote user, the host application 722 may provide user data which is transmitted using the OTT connection 750.

The communication system 100 further includes a base station 20 provided in a telecommunication system and comprising hardware 155 enabling it to communicate with the host computer or source server 700 and with the UE 10. The hardware 155 may include a communication interface 150 for setting up and maintaining a wired or wireless connection with an interface of a different communication device of the communication system 100, as well as a radio interface 160 for setting up and maintaining at least a wireless connection 165 with a UE 10 located in a coverage area (not shown in FIG. 32) served by the base station 20. The communication interface 150 may be configured to facilitate a connection 151 to the host computer 700. The connection 151 may be direct or it may pass through a CN (not shown in FIG. 32) of the telecommunication system and/or through one or more intermediate networks outside the telecommunication system. In the embodiment shown, the hardware 155 of the base station 20 further includes processing circuitry 170, which may comprise one or more programmable processors, application-specific integrated circuits, field programmable gate arrays or combinations of these (not shown) adapted to execute instructions. The base station 20 further has software 156 stored internally or accessible via an external connection.

The communication system 100 further includes the UE 10 already referred to. Its hardware 185 may include a radio interface 180 configured to set up and maintain a wireless connection 165 with a base station serving a coverage area in which the UE 10 is currently located. The hardware 185 of the UE 10 further includes processing circuitry 190, which may comprise one or more programmable processors, application-specific integrated circuits, field programmable gate arrays or combinations of these (not shown) adapted to execute instructions. The UE 10 further comprises software 186, which is stored in or accessible by the UE 10 and executable by the processing circuitry 190. The software 186 includes a client application 192. The client application 192 may be operable to provide a service to a human or non-human user via the UE 10, with the support of the host computer or source server 700. In the host computer or source server 700, an executing host application 722 may communicate with the executing client application 192 via the OTT connection 750 terminating at the UE 10 and the host computer or source server 700. In providing the service to the user, the client application 192 may receive request data from the host application 722 and provide user data in response to the request data. The OTT connection 750 may transfer both the request data and the user data. The client application 192 may interact with the user to generate the user data that it provides.

Figure 32:
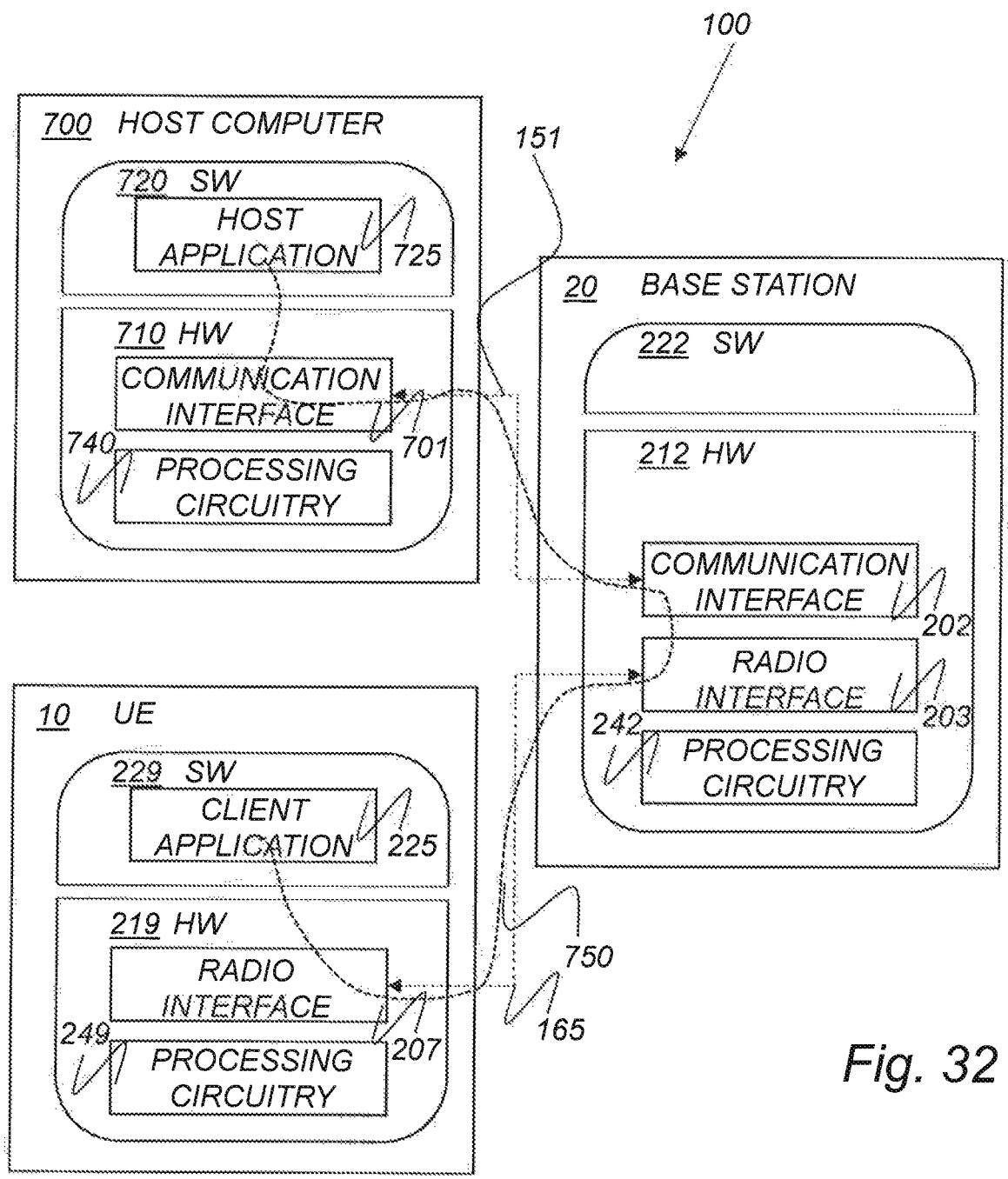
FIG. 32 is a generalized block diagram of a host computer communicating via a base station with a user equipment over a partially wireless connection.

It is noted that the host computer or source server 700, base station 20 and UE 10 illustrated in FIG. 32 may be identical to the host computer or source server 700, one of the base stations 20a, 20b, 20c and one of the UEs 10a-d of FIG. 31, respectively. This is to say, the inner workings of these entities may be as shown in FIG. 32 and independently, the surrounding network topology may be that of FIG. 31.

In FIG. 32, the OTT connection 750 has been drawn abstractly to illustrate the communication between the host computer or source server 700 and the use equipment 10 via the base station 20, without explicit reference to any intermediary devices and the precise routing of messages via these devices. Network infrastructure may determine the routing, which it may be configured to hide from the UE 10 or from the service provider operating the host computer or source server 700, or both. While the OTT connection 750 is active, the network infrastructure may further take decisions by which it dynamically changes the routing (e.g., on the basis of load balancing consideration or reconfiguration of the network).

The wireless connection 165 between the UE 10 and the base station 20 is in accordance with the teachings of the embodiments described throughout this disclosure. One or more of the various embodiments improve the performance of OTT services provided to the UE 10 using the OTT connection 750, in which the wireless connection 165 forms the last segment. More precisely, the teachings of these embodiments may improve the latency and/or delay alignment and thereby provide benefits such as reduced buffer sizes and more reliable streaming operations.

A measurement procedure may be provided for the purpose of monitoring data rate, latency and other factors on which the one or more embodiments improve. There may further be an optional network functionality for reconfiguring the OTT connection 750 between the host computer or source server 700 and UE 10, in response to variations in the measurement results. The measurement procedure and/or the network functionality for reconfiguring the OTT connection 750 may be implemented in the software 720 of the host computer or source server 700 or in the software 186 of the UE 10, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 720, 186 may compute or estimate the monitored quantities. The reconfiguring of the OTT connection 750 may include message format, retransmission settings, preferred routing etc.; the reconfiguring need not affect the base station 20, and it may be unknown or imperceptible to the base station 20. Such procedures and functionalities may be known and practiced in the art. In certain embodiments, measurements may involve proprietary UE signalling facilitating the host computer's or source server's 700 measurements of throughput, propagation times, latency and the like. The measurements may be implemented in that the software 720 causes messages to be transmitted, in particular empty or 'dummy' messages, using the OTT connection 750 while it monitors propagation times, errors etc.

Figure 33:
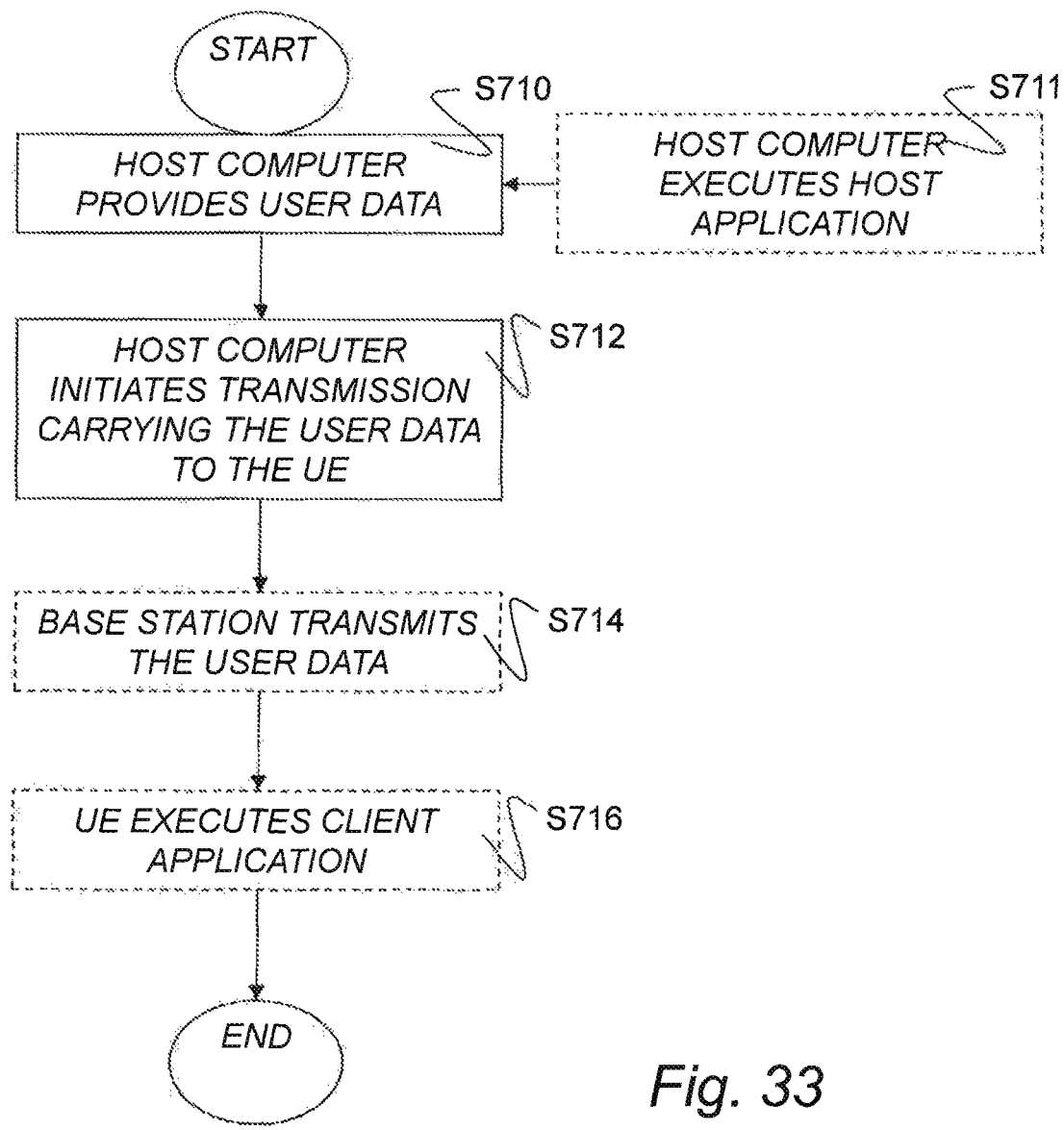
FIGS. 33-36 are flowcharts illustrating methods implemented in a communication system including a host computer, a base station and a user equipment.

FIG. 33 is a flowchart illustrating a method implemented in a communication system, in accordance with one embodiment. The communication system includes a host computer, a base station and a UE which may be those described with reference to FIGS. 31 and 32. For simplicity of the present disclosure, only drawing references to FIG. 33 will be included in this section. In a first step S710 of the method, the host computer provides user data. In an optional substep S711 of the first step S710, the host computer provides the user data by executing a host application. In a second step S712, the host computer initiates a transmission carrying the user data to the UE. In an optional third step S714, the base station transmits to the UE the user data which was carried in the transmission that the host computer initiated, in accordance with the teachings of the embodiments described throughout this disclosure. In an optional fourth step S716, the UE executes a client application associated with the host application executed by the host computer.

Figure 34:
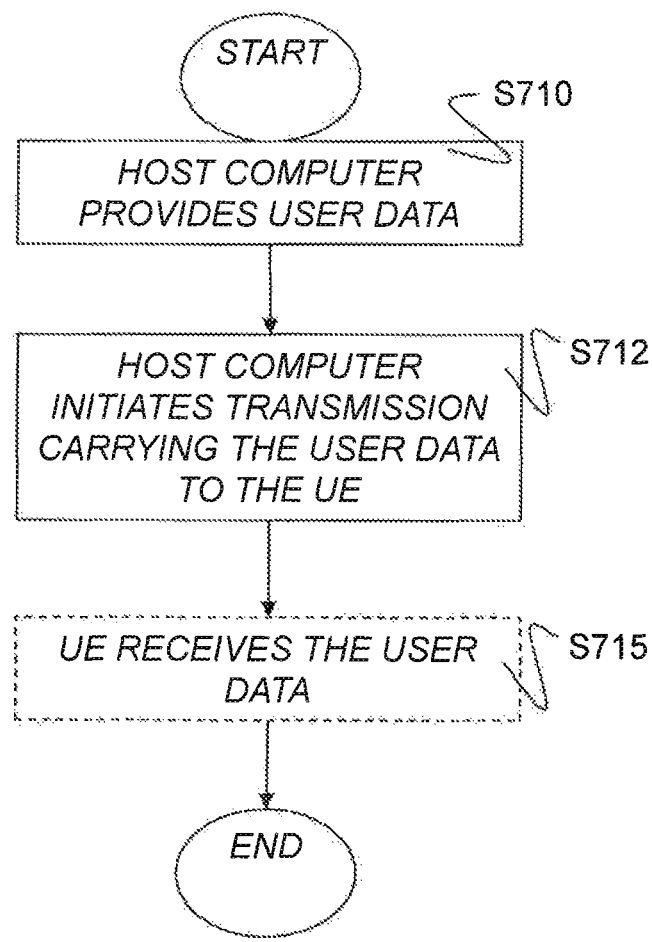

FIG. 34 is a flowchart illustrating a method implemented in a communication system, in accordance with one embodiment. The communication system includes a host computer, a base station and a UE which may be those described with reference to FIGS. 31 and 32. For simplicity of the present disclosure, only drawing references to FIG. 34 will be included in this section. In a first step S710 of the method, the host computer provides user data. In an optional substep (not shown) the host computer provides the user data by executing a host application. In a second step S712, the host computer initiates a transmission carrying the user data to the UE. The transmission may pass via the base station, in accordance with the teachings of the embodiments described throughout this disclosure. In an optional third step S715, the UE receives the user data carried in the transmission.

Figure 35:
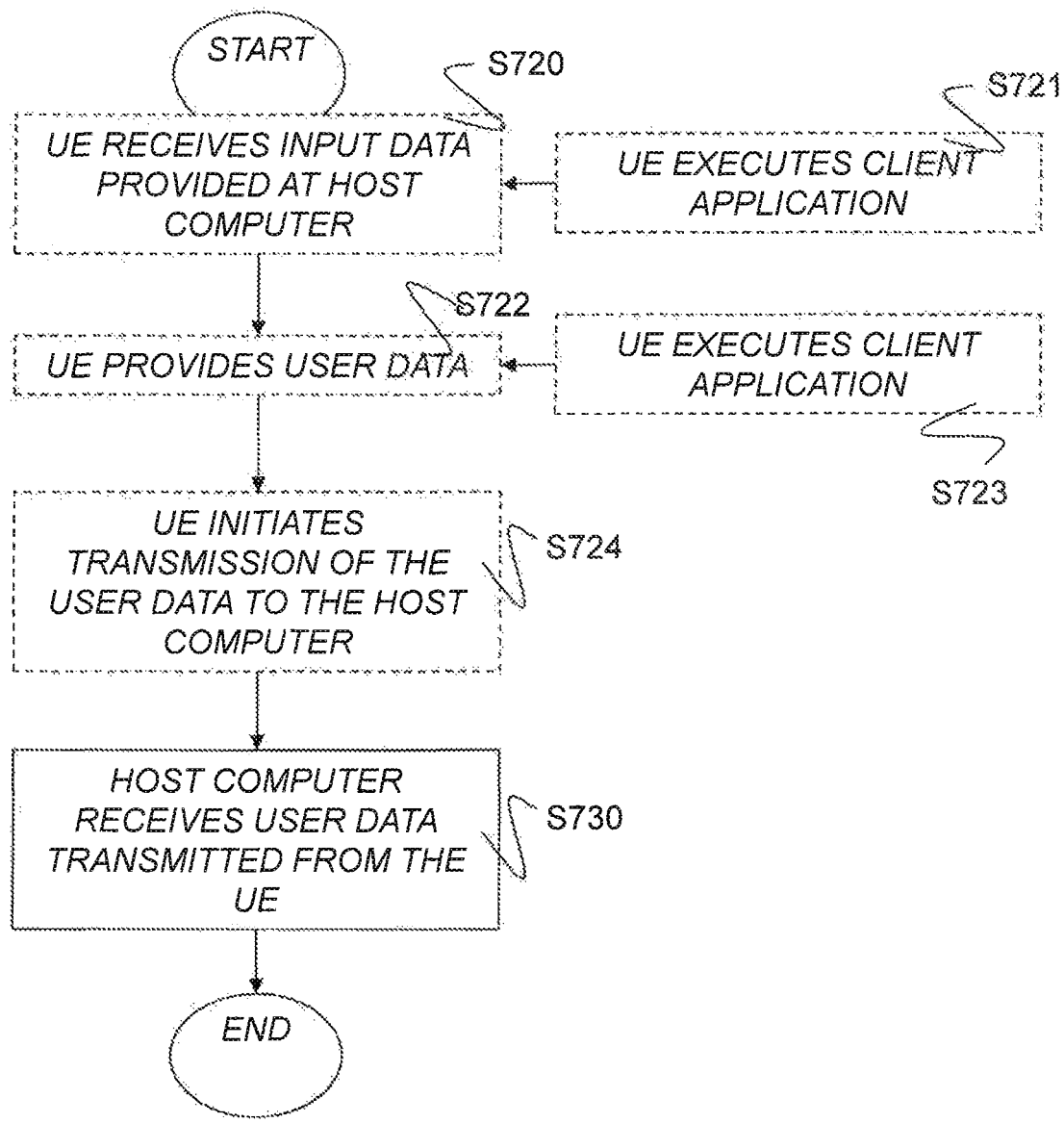

FIG. 35 is a flowchart illustrating a method implemented in a communication system, in accordance with one embodiment. The communication system includes a host computer, a base station and a UE which may be those described with reference to FIGS. 31 and 32. For simplicity of the present disclosure, only drawing references to FIG. 35 will be included in this section. In an optional first step S720 of the method, the UE receives input data provided by the host computer. Additionally or alternatively, in an optional second step S722, the UE provides user data. In an optional substep S723 of the second step S722, the UE provides the user data by executing a client application. In a further optional substep S721 of the first step S720, the UE executes a client application which provides the user data in reaction to the received input data provided by the host computer. In providing the user data, the executed client application may further consider user input received from the user. Regardless of the specific manner in which the user data was provided, the UE initiates, in an optional third substep S724, transmission of the user data to the host computer. In a fourth step S730 of the method, the host computer receives the user data transmitted from the UE, in accordance with the teachings of the embodiments described throughout this disclosure.

Figure 36:
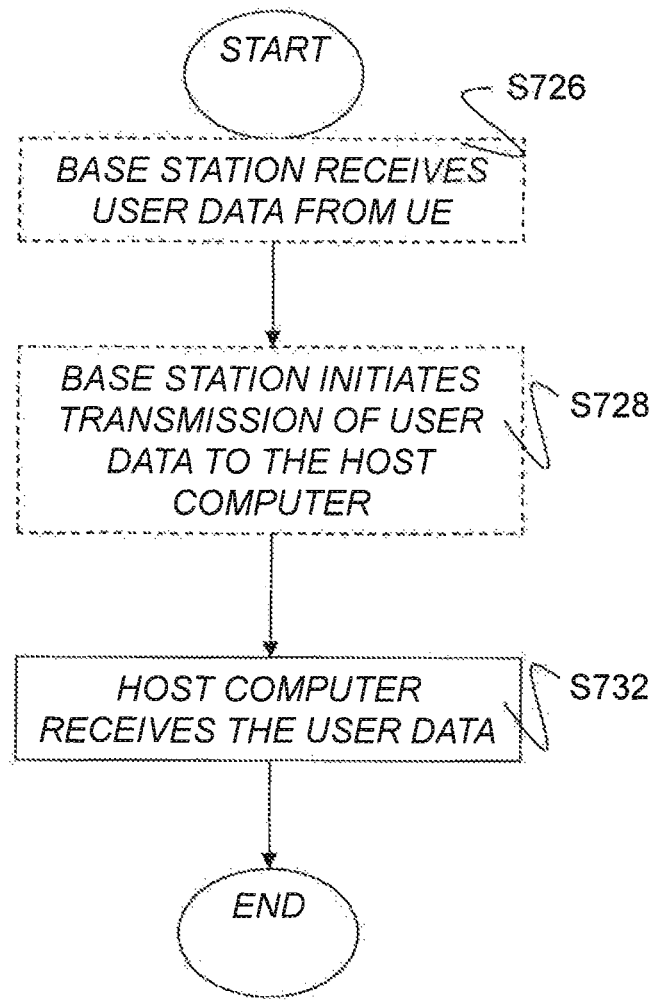

FIG. 36 is a flowchart illustrating a method implemented in a communication system, in accordance with one embodiment. The communication system includes a host computer, a base station and a UE which may be those described with reference to FIGS. 31 and 32. For simplicity of the present disclosure, only drawing references to FIG. 36 will be included in this section. In an optional first step S726 of the method, in accordance with the teachings of the embodiments described throughout this disclosure, the base station receives user data from the UE. In an optional second step S728, the base station initiates transmission of the received user data to the host computer. In a third step S732, the host computer receives the user data carried in the transmission initiated by the base station.

NUMBERED EMBODIMENTS

1. A network node configured to communicate with a wireless device, the network node comprising a radio interface and processing circuitry configured to attach to a data item, intended to be transmitted over a first signalling path out of a plurality of possible signalling paths, information about an identity of a particular signalling path to be selected as a second signalling path out of the plurality of possible signalling paths for an acknowledgement message for the data item.
2. The network node of embodiment 1, wherein the network node is a base station.
3. A communication system including a host computer comprising:
    processing circuitry configured to provide user data; and
    a communication interface configured to forward the user data to a cellular network for transmission to a wireless device,
    wherein the cellular network comprises a network node having a radio interface and processing circuitry, the processing circuitry of the network node being configured to attach to a data item, intended to be transmitted over a first signalling path out of a plurality of possible signalling paths, information about an identity of a particular signalling path to be selected as a second signalling path out of the plurality of possible signalling paths for an acknowledgement message for the data item.
4. The communication system of embodiment 3, further including the network node.
5. The communication system of embodiment 4, further including the wireless device, wherein the wireless device is configured to communicate with the network node.
6. The communication system of embodiment 5, wherein:
    the processing circuitry of the host computer is configured to execute a host application, thereby providing the user data; and
    the wireless device comprises processing circuitry configured to execute a client application associated with the host application.
7. The communication system of any of the embodiments 3 to 6, wherein the wireless device is a user equipment.
8. The communication system of any of the embodiments 3 to 7, wherein the network node is a base station.
9. A network node configured to communicate with a wireless device, the network node comprising a radio interface and processing circuitry configured to attach to a data item, intended to be transmitted over a first signalling path out of a plurality of possible signalling paths, an indication of a request for specifying a signalling path out of the plurality of possible signalling paths for acknowledgement messages.
10. The network node of embodiment 9, wherein the network node is a base station.
11. A communication system including a host computer comprising:
   processing circuitry configured to provide user data; and
   a communication interface configured to forward the user data to a cellular network for transmission to a wireless device,
   wherein the cellular network comprises a network node having a radio interface and processing circuitry, the processing circuitry of the network node being configured to attach to a data item, intended to be transmitted over a first signalling path out of a plurality of possible signalling paths, an indication of a request for specifying a signalling path out of the plurality of possible signalling paths for acknowledgement messages.
12. The communication system of embodiment 11, further including the network node.
13. The communication system of embodiment 12, further including the wireless device, wherein the wireless device is configured to communicate with the network node.
14. The communication system of embodiment 13, wherein:
   the processing circuitry of the host computer is configured to execute a host application, thereby providing the user data; and
   the wireless device comprises processing circuitry configured to execute a client application associated with the host application.
15. The communication system of any of the embodiments 11 to 14, wherein the wireless device is a user equipment.
16. The communication system of any of the embodiments 11 to 15, wherein the network node is a base station.
17. A network node configured to communicate with a wireless device, the network node comprising a radio interface and processing circuitry configured to detect a link on which an acknowledgement message of a data item sent on a first signalling path out of a plurality of possible signalling paths was received and to attach information of the identity of the link to the acknowledgement message.
18. The network node of embodiment 17, wherein the network node is a base station.
19. A communication system including a host computer comprising:
   processing circuitry configured to provide user data; and
   a communication interface configured to forward the user data to a cellular network for transmission to a wireless device,
   wherein the cellular network comprises a network node having a radio interface and processing circuitry, the processing circuitry of the network node being configured to detect a link on which an acknowledgement message of a data item sent on a first signalling path out of a plurality of possible signalling paths was received and to attach information of the identity of the link to the acknowledgement message.
20. The communication system of embodiment 19, further including the network node.
21. The communication system of embodiment 20, further including the wireless device, wherein the wireless device is configured to communicate with the network node.
22. The communication system of embodiment 21, wherein:
   the processing circuitry of the host computer is configured to execute a host application, thereby providing the user data; and
   the wireless device comprises processing circuitry configured to execute a client application associated with the host application.
23. The communication system of any of the embodiments 19 to 22, wherein the wireless device is a user equipment.
24. The communication system of any of the embodiments 19 to 23, wherein the network node is a base station.
25. A method implemented in a network node, comprising attaching to a data item, intended to be transmitted over a first signalling path out of a plurality of possible signalling paths, information about an identity of a particular signalling path to be selected as a second signalling path out of the plurality of possible signalling paths for an acknowledgement message for the data item.
26. A method implemented in a communication system including a host computer, a network node and a wireless device, the method comprising:
   at the host computer, providing user data; and
   at the host computer, initiating a transmission carrying the user data to the wireless device via a cellular network comprising the network node;
   at the network node detecting a link on which an acknowledgement message of a data item sent on a first signalling path out of a plurality of possible signalling paths was received and to attach information of the identity of the link to the acknowledgement message.
27. The method of embodiment 26, further comprising: at the network node, transmitting the user data.
28. The method of embodiment 27, wherein the user data is provided at the host computer by executing a host application, the method further comprising:
   at the wireless device, executing a client application associated with the host application.
29. The method of any of the embodiments 26 to 28, wherein the wireless device is a user equipment.
30. The method of any of the embodiments 25 to 29, wherein the network node is a base station.
31. A method implemented in a network node, comprising attaching to a data item, intended to be transmitted over a first signalling path out of a plurality of possible signalling paths, an indication of a request for specifying a signalling path out of the plurality of possible signalling paths for acknowledgement messages.
32. A method implemented in a communication system including a host computer, a network node and a wireless device, the method comprising:
   at the host computer, providing user data; and
   at the host computer, initiating a transmission carrying the user data to the wireless device via a cellular network comprising the network node;

at the network node attaching to a data item, intended to be transmitted over a first signalling path out of a plurality of possible signalling paths, an indication of a request for specifying a signalling path out of the plurality of possible signalling paths for acknowledgement messages.

33. The method of embodiment 32, further comprising: at the network node, transmitting the user data.

34. The method of embodiment 33, wherein the user data is provided at the host computer by executing a host application, the method further comprising:
at the wireless device, executing a client application associated with the host application.

35. The method of any of the embodiments 32 to 34, wherein the wireless device is a user equipment.

36. The method of any of the embodiments 31 to 35, wherein the network node is a base station.

37. A method implemented in a network node, comprising detecting a second signalling path, out of a plurality of possible signalling paths, on which an acknowledgement message of a data item sent on a first signalling path, out of a plurality of possible signalling paths, was received, and attaching information of the identity of the second signalling path to the acknowledgement message.

38. A method implemented in a communication system including a host computer, a network node and a wireless device, the method comprising:
at the host computer, providing user data; and
at the host computer, initiating a transmission carrying the user data to the wireless device via a cellular network comprising the network node;
at the network node detecting a second signalling path, out of a plurality of possible signalling paths, on which an acknowledgement message of a data item sent on a first signalling path, out of a plurality of possible signalling paths, was received; and
at the network node attaching information of the identity of the second signalling path to the acknowledgement message.

39. The method of embodiment 38, further comprising: at the network node, transmitting the user data.

40. The method of embodiment 39, wherein the user data is provided at the host computer by executing a host application, the method further comprising:
at the wireless device, executing a client application associated with the host application.

41. The method of any of the embodiments 38 to 40, wherein the wireless device is a user equipment.

42. The method of any of the embodiments 37 to 41, wherein the network node is a base station.

43. A wireless device configured to communicate with a network node, the wireless device comprising a radio interface and processing circuitry configured to receive a data item over a first signalling path out of a plurality of possible signalling paths, to obtain signalling path information associated with the received data item, and to initiate a transmission of an acknowledgement message for the data item over a second signalling path out of the plurality of possible signalling paths selected in dependence of the obtained signalling path information.

44. The wireless device of embodiment 43, wherein the wireless device is a user equipment.

45. A communication system including a host computer comprising:
processing circuitry configured to provide user data; and
a communication interface configured to forward user data to a cellular network for transmission to a wireless device,
wherein the wireless device comprises a radio interface and processing circuitry, the processing circuitry of the wireless device being configured to receive a data item over a first signalling path out of a plurality of possible signalling paths, to obtain signalling path information associated with the received data item, and to initiate a transmission of an acknowledgement message for the data item over a second signalling path out of the plurality of possible signalling paths selected in dependence of the obtained signalling path information.

46. The communication system of embodiment 45, further including the wireless device.

47. The communication system of embodiment 46, wherein the cellular network further includes a network node configured to communicate with the wireless device.

48. The communication system of embodiment 47, wherein the network node is a base station.

49. The communication system of any of the embodiments 45 to 48, wherein:
the processing circuitry of the host computer is configured to execute a host application, thereby providing the user data; and
the processing circuitry of the wireless device is configured to execute a client application associated with the host application.

50. The communication system of any of the embodiments 45 to 49, wherein the wireless device is a user equipment.

51. A wireless device configured to communicate with a network node, the wireless device comprising a radio interface and processing circuitry configured to receive a data item over a first signalling path out of a plurality of possible signalling paths, and to initiate a transmission of an acknowledgement message for the data item over a second signalling path out of the plurality of possible signalling paths, wherein the initiating comprises attaching information of the identity of the second signalling path to the acknowledgement message.

52. The wireless device of embodiment 51, wherein the wireless device is a user equipment.

53. A communication system including a host computer comprising:
processing circuitry configured to provide user data; and
a communication interface configured to forward user data to a cellular network for transmission to a wireless device,
wherein the wireless device comprises a radio interface and processing circuitry, the processing circuitry of the wireless device being configured to receive a data item over a first signalling path out of a plurality of possible signalling paths, and to initiate a transmission of an acknowledgement message for the data item over a second signalling path out of the plurality of possible signalling paths, wherein the initiating comprises attaching information of the identity of the second signalling path to the acknowledgement message.

54. The communication system of embodiment 53, further including the wireless device.

55. The communication system of embodiment 54, wherein the cellular network further includes a network node configured to communicate with the wireless device.

56. The communication system of embodiment 55, wherein the network node is a base station.

57. The communication system of any of the embodiments 53 to 56, wherein:
the processing circuitry of the host computer is configured to execute a host application, thereby providing the user data; and
the processing circuitry of the wireless device is configured to execute a client application associated with the host application.

58. The communication system of any of the embodiments 53 to 57, wherein the wireless device is a user equipment.

59. A method implemented in a wireless device, comprising receiving a data item over a first signalling path out of a plurality of possible signalling paths, obtaining signalling path information associated with the received data item, and initiating a transmission of an acknowledgement message for the data item over a second signalling path out of the plurality of possible signalling paths selected in dependence of the obtained signalling path information.

60. A method implemented in a communication system including a host computer, a network node and a wireless device, the method comprising:
at the host computer, providing user data; and
at the host computer, initiating a transmission carrying the user data to the wireless device via a cellular network comprising the network node;
at the wireless device receiving a data item over a first signalling path out of a plurality of possible signalling paths;
at the wireless device obtaining signalling path information associated with the received data item; and
at the wireless device initiating a transmission of an acknowledgement message for the data item over a second signalling path out of the plurality of possible signalling paths selected in dependence of the obtained signalling path information.

61. The method of embodiment 60, further comprising:
at the wireless device, receiving the user data from the network node.

62. The method of embodiment 60 or 61, wherein the network node is a base station.

63. The method of any of the embodiments 59 to 62, wherein the wireless device is a user equipment.

64. A method implemented in a wireless device, comprising receiving a data item over a first signalling path out of a plurality of possible signalling paths, and initiating a transmission of an acknowledgement message for the data item over a second signalling path out of the plurality of possible signalling paths, wherein the initiating comprises attaching information of the identity of the second signalling path to the acknowledgement message.

65. A method implemented in a communication system including a host computer, a network node and a wireless device, the method comprising:
at the host computer, providing user data; and
at the host computer, initiating a transmission carrying the user data to the wireless device via a cellular network comprising the network node;
at the wireless device receiving a data item over a first signalling path out of a plurality of possible signalling paths; and
at the wireless device initiating a transmission of an acknowledgement message for the data item over a second signalling path out of the plurality of possible signalling paths, wherein the initiating comprises attaching information of the identity of the second signalling path to the acknowledgement message.

66. The method of embodiment 65, further comprising:
at the wireless device, receiving the user data from the network node.

67. The method of embodiment 65 or 66, wherein the network node is a base station.

68. The method of any of the embodiments 64 to 67, wherein the wireless device is a user equipment.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

3GPP 3rd Generation Partnership Project
4G 4th Generation
5G 5th Generation
AAS Antenna Array System
ASIC Application Specific Integrated Circuits
BTS Base Transceiver Stations
CD Compact Disc
CN Core Network
COTS Common Off-The-Shelf
CPE Customer Premises Equipment
CPU Central Processing Units
DSP Digital Signal Processors
DL DownLink
DVD Digital Versatile Disc
eNB evolved Node B
FPGA Field Programmable Gate Arrays
gNB New Radio Node B
HDD Hard Disk Drive
HW hardware
IEEE Institute of Electrical Electronics Engineering
I/O input/output
LEE Laptop Embedded Equipment
LME Laptop Mounted Equipment
LTE Long-Term Evolution
MEM memory units
NE Node B
ND Network Device
NFV Network Function Virtualization
NI Network Interfaces
NIC Network Interface Controller
NR New Radio
OS Operating System
OSS Operations and Support System
PC Personal Computer
PDA Personal Digital Assistant
PLC Programmable Logic Controllers RAM Random Access Memory
RAN Radio Access Network
REG registers
ROM Read-Only Memory
RRU Remote Radio Units
STA Station
SW software
UE User Equipment
UL UpLink
URLLC Ultra-Reliable Low Latency Communication
USB Universal Serial Bus
VM Virtual Machine
VMM Virtual Machine Monitor
VNE Virtual Network Element
WNIC Wireless Network Interface Controller
VR Virtual Reality

The invention claimed is:

1. A method for controlling acknowledgement signalling in a multi-point communication system, wherein said method comprises the steps of:
receiving, in a wireless device, a data item over a first signalling path out of a plurality of possible signalling paths;
obtaining signalling path information associated with said received data item; wherein said signalling path information comprises an identity of a particular signalling path to be selected as a second signalling path;
initiating a transmission of an acknowledgement message for said data item over the second signalling path out of said plurality of possible signalling paths selected in dependence of said obtained signalling path information,
wherein said step of obtaining signalling path information comprises obtaining of information about the identity of said first signalling path of said received data item; and by the further step of:
determining said second signalling path out of said plurality of possible signalling paths in dependence of said identity of said first signalling path, and
wherein said step of determining said second signalling path is performed in further dependency of signal properties of said received data item, and
said signal properties are selected from:
priority of said received data item;
latency demands for said received data item; and
source of said received data item.

2. The method according to claim 1, wherein said step of obtaining information about the identity of said first signalling path comprises detection, in said wireless device, of a link on which said received data item was received.

3. The method according to claim 1, wherein said step of obtaining information about the identity of said first signalling path comprises retrieving information about the identity of said first signalling path attached to said received data item.

4. The method according to claim 3, wherein said information about the identity of said first signalling path attached to said received data item is attached by at least one of:
a source server of said received data item;
a node between said source server of said received data item and a node controlling assignments of signalling paths;
said node controlling assignments of signalling paths; and
a transmitter node for said received data item.

5. The method according to claim 1, wherein said information about said identity of a particular signalling path to be selected as said second signalling path is attached to said received data item by at least one of:
a source server of said received data item;
a node between said source server of said received data item and a node controlling assignments of signalling paths;
said node controlling assignments of signalling paths; and
a transmitter node for said received data item.

6. The method according to claim 1, wherein said second signalling path is the same as said first signalling path.

7. The method according to claim 1, wherein said second signalling path is different from said first signalling path.

8. A method for assisting in controlling acknowledgement signalling in a multi-point communication system, wherein said method comprises the step of:
attaching, in a network node, to a data item, intended to be transmitted over a first signalling path out of a plurality of possible signalling paths, information about an identity of a particular signalling path to be selected as a second signalling path out of said plurality of possible signalling paths for an acknowledgement message for said data item, wherein the second signaling path is selected out of said plurality of possible signalling paths in dependence of an identity of said first signalling path and in further dependency of signal properties of said data item, wherein said signal properties are selected from: priority of said data item; latency demands for said data item; and source of said data item.

9. A wireless device configured to control acknowledgement signalling in a multi-point communication system, the wireless device comprising:
processing circuitry; and
a memory containing instructions which when executed by the processing circuitry, cause said processing circuitry to:
receive a data item over a first signalling path out of a plurality of possible signalling paths;
obtain signalling path information associated with said received data item; and
initiate a transmission of an acknowledgement message for said data item over a second signalling path out of said plurality of possible signalling paths selected in dependence of said obtained signalling path information, wherein said signalling path information comprises an identity of a particular signalling path to be selected as a second signalling path,
wherein said step of obtaining signalling path information comprises obtaining of information about the identity of said first signalling path of said received data item; and by the further step of:
determine said second signalling path out of said plurality of possible signalling paths in dependence of said identity of said first signalling path, and
wherein said step of determining said second signalling path is performed in further dependency of signal properties of said received data item, and
said signal properties are selected from:
priority of said received data item;
latency demands for said received data item; and
source of said received data item.

10. A network node configured to assist in controlling acknowledgement signalling in a multi-point communication system, the network node comprising:

processing circuitry; and a memory containing instructions which when executed by the processing circuitry, cause said processing circuitry to:

attach to a data item, intended to be transmitted over a first signalling path out of a plurality of possible signalling paths, information about an identity of a particular signalling path to be selected as a second signalling path out of said plurality of possible signalling paths for an acknowledgement message for said data item, wherein the second signaling path is selected out of said plurality of possible signalling paths in dependence of an identity of said first signalling path and in further dependency of signal properties of said data item, wherein said signal properties are selected from: priority of said data item; latency demands for said data item; and source of said data item.

11. A computer program product comprising a non-transitory computer readable medium storing a computer program comprising instructions, which when executed by at least one processor, cause said at least one processor to:

attach to a data item, intended to be transmitted over a first signalling path out of a plurality of possible signalling paths, information about an identity of a particular signalling path to be selected as a second signalling path out of said plurality of possible signalling paths for an acknowledgement message for said data item, wherein the second signaling path is selected out of said plurality of possible signalling paths in dependence of an identity of said first signalling path and in further dependency of signal properties of said data item, wherein said signal properties are selected from: priority of said data item; latency demands for said data item; and source of said data item.

* * * * *